United States Patent
Ryu

(10) Patent No.: US 8,824,057 B2
(45) Date of Patent: Sep. 2, 2014

(54) TELEPHOTO ZOOM LENS SYSTEM AND PHOTOGRAPHING APPARATUS HAVING THE SAME

(71) Applicant: Samsung Electronics Co., Ltd., Suwon-si (KR)

(72) Inventor: Jae-myung Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 13/756,791

(22) Filed: Feb. 1, 2013

(65) Prior Publication Data

US 2013/0301141 A1 Nov. 14, 2013

(30) Foreign Application Priority Data

May 11, 2012 (KR) .................. 10-2012-0050468

(51) Int. Cl.
*G02B 15/14* (2006.01)
*G02B 15/00* (2006.01)
*G02B 15/15* (2006.01)
*G02B 15/16* (2006.01)

(52) U.S. Cl.
CPC ............ *G02B 15/00* (2013.01); *G02B 15/15* (2013.01); *G02B 15/16* (2013.01)
USPC ....................................... 359/676

(58) Field of Classification Search
CPC ........ G02B 15/00; G02B 15/14; G02B 15/15; G02B 15/16; G02B 15/20; G02B 15/22
USPC .................. 359/676–679, 683–685
See application file for complete search history.

(56) References Cited

U.S. PATENT DOCUMENTS

| 8,654,447 B2 * | 2/2014 | Morooka ............... 359/683 |
| 2003/0133200 A1 | 7/2003 | Sato |
| 2009/0086321 A1 | 4/2009 | Mizuguchi et al. |
| 2010/0214658 A1 | 8/2010 | Ito |
| 2011/0228407 A1 | 9/2011 | Yamaguchi |
| 2012/0140337 A1 * | 6/2012 | Miyatani et al. ............ 359/684 |

FOREIGN PATENT DOCUMENTS

| JP | 2003-344766 A | 12/2003 |
| JP | 2006-201524 A | 8/2006 |
| JP | 2009-086535 A | 4/2009 |
| JP | 2009-086537 A | 4/2009 |
| JP | 2009-156893 A | 7/2009 |
| JP | 2010-191334 A | 9/2010 |

(Continued)

OTHER PUBLICATIONS

Search Report established for EP 13155836.3 (Jul. 29, 2013).

*Primary Examiner* — Darryl J Collins
(74) *Attorney, Agent, or Firm* — Drinker Biddle & Reath LLP

(57) ABSTRACT

A telephoto zoom lens system includes a first lens group having a positive focal length, a second lens group having a negative focal length, a third lens group having a positive or negative focal length, a fourth lens group having a positive focal length, and a fifth lens group for performing hand shake compensation by allowing a portion of the fifth lens group to move perpendicularly to the optical axis. During zooming, the first and fifth lens groups are fixed and the second, third, and fourth lens groups move, and the third or fourth lens group is a focusing lens group.

17 Claims, 17 Drawing Sheets

(WIDE ANGLE POSITION)

(MIDDLE POSITION)

(TELEPHOTO POSITION)

(56) References Cited

FOREIGN PATENT DOCUMENTS

| | | |
|---|---|---|
| JP | 2010-191335 A | 9/2010 |
| JP | 2010-191336 A | 9/2010 |
| JP | 2011-090080 A | 5/2011 |
| JP | 2011-158599 A | 8/2011 |
| JP | 2011-197302 A | 10/2011 |

* cited by examiner (WIDE ANGLE POSITION)

(MIDDLE POSITION)

(TELEPHOTO POSITION)

TELEPHOTO ZOOM LENS SYSTEM AND PHOTOGRAPHING APPARATUS HAVING THE SAME

CROSS-REFERENCE TO RELATED PATENT APPLICATIONS

This application claims the benefit of Korean Patent Application No. 10-2012-0050468, filed on May 11, 2012, in the Korean Intellectual Property Office, the disclosure of which is incorporated herein in its entirety by reference.

BACKGROUND

Embodiments relate to a telephoto zoom lens system capable of fast focusing with a lighter focusing lens group, and a photographing apparatus having such a telephoto zoom lens system.

With respect to a photographing apparatus using a solid state image sensor such as a digital camera, an interchangeable lens system, or a video camera, users demand high resolution, high magnification, etc. Also, consumer sophistication in photographing apparatuses has increased. Accordingly, a large diameter telephoto zoom lens system has been increasingly developed according to the market trends. In a large diameter telephoto zoom lens system, the lens group located directly behind a first lens group is commonly used as a focusing lens group. However, since the diameter of the first lens group is relatively large, the diameter of a subsequent lens group is relatively large as well and thus the weight of the focusing lens group increases. When a focusing lens group is heavy, the focusing lens group cannot be moved as quickly.

SUMMARY

An embodiment provides a telephoto zoom lens system capable of fast focusing with a lighter focusing lens group.

An embodiment also provides a photographing apparatus including a telephoto zoom lens system capable of fast focusing with a lighter focusing lens group.

According to an embodiment, a telephoto zoom lens system comprises a first lens group having a positive focal length, a second lens group having a negative focal length, a third lens group having a positive or negative focal length, a fourth lens group having a positive focal length, and a fifth lens group for performing hand shake compensation by allowing a portion of the fifth lens group to move perpendicularly to the optical axis, wherein, during zooming, the first and fifth lens groups are fixed and the second, third, and fourth lens groups move, the third or fourth lens group is a focusing lens group, and the following inequalities are satisfied, $$-0.25 \leq \frac{1}{2}\left(\frac{f_{wide}}{f_{1AFwide}} + \frac{f_{tele}}{f_{1AFtele}}\right) \leq 0.1$$

and $$-3.5 \leq \frac{f_{+,max}}{f_{-,min}} \leq -1.7,$$

wherein $f_{+,max}$ is the focal length of a lens group having the longest positive focal length of the second to fourth lens groups moving during zooming, $f_{-,min}$ is the focal length of a lens group having the shortest negative focal length of the second to fourth lens groups moving during zooming, $f_{1AFwide}$ is the focal length at the wide angle position from the first lens group to the focusing lens group, $f_{wide}$ is the focal length at the wide angle position of the telephoto zoom lens system, $f_{1AFtele}$ is the focal length at a telephoto position from the first lens group to the focusing lens group, and $f_{tele}$ is the focal length at the telephoto position of the telephoto zoom lens system.

The telephoto zoom lens system may satisfy the following inequality, $$0.85 \leq \frac{f_4}{f_{wide}} \leq 1.2,$$

wherein $f_4$ is the focal length of the fourth lens group and $f_{wide}$ is the focal length at the wide angle position of the telephoto zoom lens system.

The third lens group may have a positive focal length and the fifth lens group may have a negative focal length.

A hand shake compensation group of the fifth lens group may be located on the object side within the fifth lens group.

Any one of the third, fourth, and fifth lens groups may include an aperture stop.

A lens surface located closest to an image side of the fourth lens group may have a concave shape toward the image side.

The first and fifth lens groups may be fixed during focusing.

An F number may be fixed during focusing.

According to another embodiment, a telephoto zoom lens system comprises a first lens group having a positive focal length, a second lens group having a negative focal length, a third lens group having a negative focal length, a fourth lens group having a positive focal length, and a fifth lens group having a positive focal length and including a hand shake compensation group that performs hand shake compensation by allowing a portion of the fifth lens group to move perpendicularly to the optical axis, wherein, during zooming, the first and fifth lens groups are fixed and the second, third, and fourth lens groups move, the fourth lens group is a focusing lens group, and the following inequalities are satisfied, $$-0.25 \leq \frac{1}{2}\left(\frac{f_{wide}}{f_{1AFwide}} + \frac{f_{tele}}{f_{1AFtele}}\right) \leq 0.1$$

and $$-3.5 \leq \frac{f_{+,max}}{f_{-,min}} \leq -1.7,$$

wherein $f_{+,max}$ is the focal length of a lens group having the longest positive focal length of the second to fourth lens groups moving during zooming, $f_{-,min}$ is the focal length of a lens group having the shortest negative focal length of the second to fourth lens groups moving during zooming, $f_{1AFwide}$ is the focal length at the wide angle position from the first lens group to the focusing lens group, $f_{wide}$ is the focal length at the wide angle position of the telephoto zoom lens system, $f_{1AFtele}$ is the focal length at the telephoto position from the first lens group to the focusing lens group, and $f_{tele}$ is the focal length at the telephoto position of the telephoto zoom lens system.

According to another embodiment, a photographing apparatus comprises a telephoto zoom lens system and an imaging device for receiving an image formed by the telephoto zoom lens system, wherein the telephoto zoom lens system comprises a first lens group having a positive focal length, a second lens group having a negative focal length, a third lens group having a positive or negative focal length, a fourth lens group having a positive focal length, and a fifth lens group for performing hand shake compensation by allowing a portion of the fifth lens group to move perpendicularly to the optical axis, wherein, during zooming, the first and fifth lens groups are fixed and the second, third, and fourth lens groups move, the third or fourth lens group is a focusing lens group, and the following inequalities are satisfied, $$-0.25 \leq \frac{1}{2}\left(\frac{f_{wide}}{f_{1AFwide}} + \frac{f_{tele}}{f_{1AFtele}}\right) \leq 0.1$$

and $$-3.5 \leq \frac{f_{+,max}}{f_{-,min}} \leq -1.7,$$

wherein $f_{+,max}$ is the focal length of a lens group having the longest positive focal length of the second to fourth lens groups moving during zooming, $f_{-,min}$ is the focal length of a lens group having the shortest negative focal length of the second to fourth lens groups moving during zooming, $f_{1AFwide}$ is the focal length at a wide angle position from the first lens group to the focusing lens group, $f_{wide}$ is the focal length at the wide angle position of the telephoto zoom lens system, $f_{1AFtele}$ is the focal length at the telephoto position from the first lens group to the focusing lens group, and $f_{tele}$ is the focal length at the telephoto position of the telephoto zoom lens system.

BRIEF DESCRIPTION OF THE DRAWINGS

The above and other features and advantages will become more apparent from the following detailed description of exemplary embodiments thereof with reference to the attached drawings in which.

DETAILED DESCRIPTION

Figure 1:
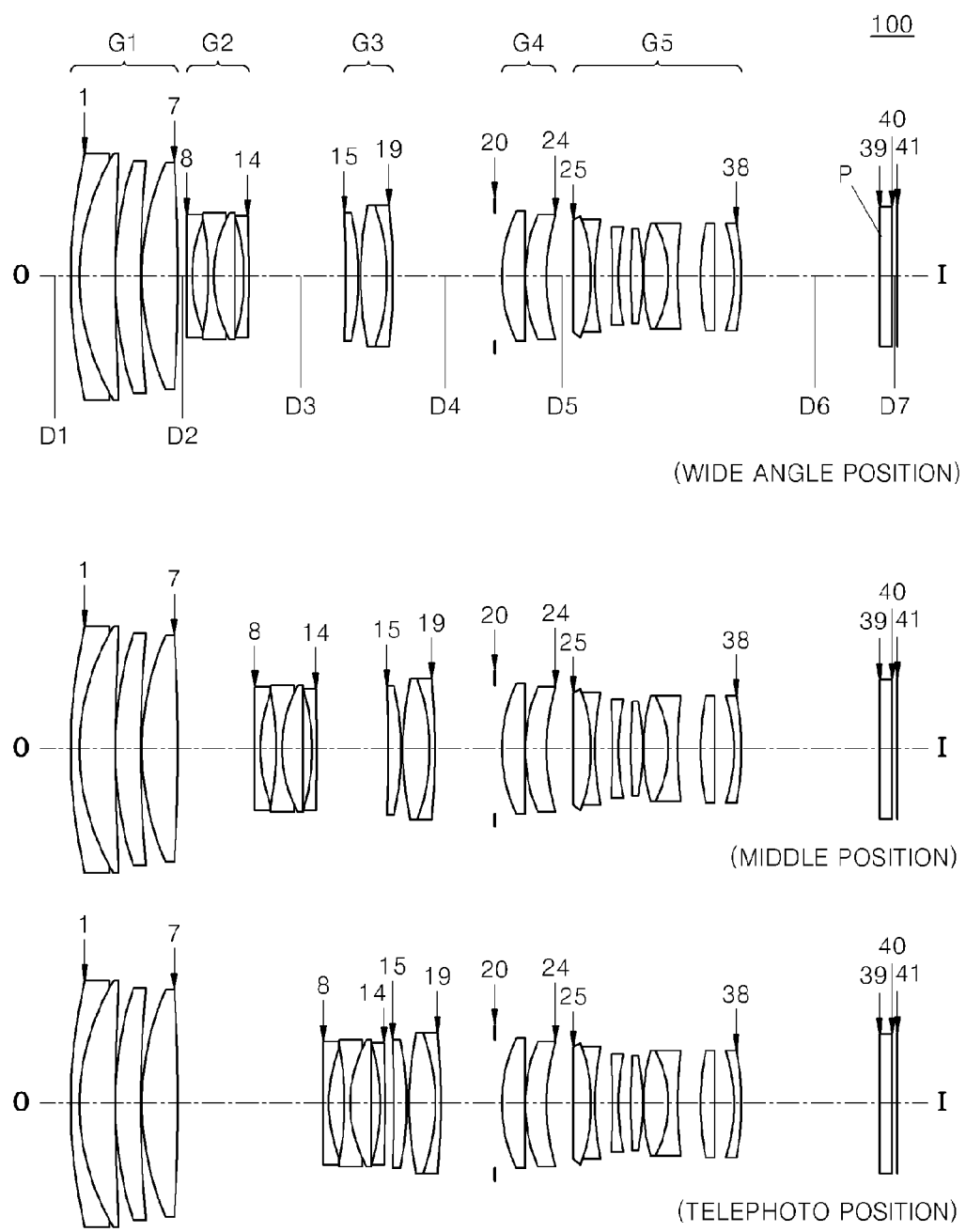
FIG. 1 is a view schematically illustrating a wide angle position, a middle position, and a telephoto position of a telephoto zoom lens system according to a first embodiment.

Hereinafter, exemplary embodiments will be described in detail with reference to the attached drawings. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

Referring to FIG. 1, the telephoto zoom lens system 100 may include, in order from an object side O, a first lens group G1 having a positive focal length, a second lens group G2 having a negative focal length, a third lens group G3 having a positive or negative focal length, a fourth lens group G4 having a positive focal length, and a fifth lens group G5 having a positive or negative focal length. During zooming, the first and fifth lens groups G1 and G5 are fixed, whereas the second, third, and fourth lens groups G2, G3, and G4 may be moved. The telephoto zoom lens system 100 is configured such that the total length of the telephoto zoom lens system 100 is not changed during zooming. Accordingly, the telephoto zoom lens system 100 is easy to carry. For example, each of the telephoto zoom lens systems illustrated in FIGS. 1, 5, and 9 may include, in order from the object side O, the first lens group G1 having a positive focal length, the second lens group G2 having a negative focal length, the third lens group G3 having a positive focal length, the fourth lens group G4 having a positive focal length, and the fifth lens group G5 having a negative focal length. For example, a telephoto zoom lens system illustrated in FIG. 13 may include, in order from the object side O, the first lens group G1 having a positive focal length, the second lens group G2 having a negative focal length, the third lens group G3 having a negative focal length, the lens group G4 having a positive focal length, and the fifth lens group G5 having a positive focal length.

A telephoto zoom lens system according to the present embodiment is a bright telephoto zoom lens with a fixed F number during zooming. To embody the lens system, the F number is maintained relatively low even at a telephoto position.

A focusing lens group for performing focusing is made lighter in order to increase focusing speed when performing focusing according to a change in an object distance. To make the focusing lens group light, the third lens group G3 or the fourth lens group G4 having a relatively small diameter and a positive focal length may be used as the focusing lens group. For example, the third lens group G3 performs focusing in the telephoto zoom lens systems illustrated in FIGS. 1, 5, and 9, whereas the fourth lens group G4 performs focusing in the telephoto zoom lens system illustrated in FIG. 13.

When a hand shake compensation group for preventing deterioration of optical performance due to hand shake of a photographer is made lighter, the drive load of a mechanism for driving the hand shake compensation group is decreased so that power consumption may be reduced and the degree of freedom in employing a driving source may be increased. To make the hand shake compensation group lighter, the focal length of the lens group located in front of the hand shake compensation group needs to be shortened. To this end, the focal length of the lens group located directly in front of the hand shake compensation group is made shorter. In the present embodiment, at least a portion of the fifth lens group G5 is moved perpendicularly to an optical axis in order to perform hand shake compensation. For example, a hand shake compensation group of the fifth lens group G5 may be located at an object side within the fifth lens group G5. The focal length of the fourth lens group G4 may be made relatively shorter to make the hand shake compensation group lighter.

Also, to compensate for field curves according to zooming, a compensation lens group moving during zooming may be provided in front of or behind the focusing lens group. For example, when the third lens group G3 is used as the focusing lens group, the fourth lens group G4 may compensate for field curves according to zooming. The first and fifth lens groups G1 and G5 may be fixed to fix the total length of the telephoto zoom lens system. In addition, the first and fifth lens groups G1 and G5 may be fixed during focusing. When a lens group including the hand shake compensation group is not moved during zooming, which is advantageous for configuration of the drive mechanism for zooming, the fifth lens group G5 including the hand shake compensation group may be fixed during zooming. When aberration compensation amounts of the second to fourth lens groups G2-G4, which are movable lens groups, are uniform, optical performance may be improved. To this end, refractive power may be arranged such that a difference in the focal lengths between the movable lens groups is not great.

In the telephoto zoom lens system according to the present embodiment, the second to fourth lens groups G2-G4 move as follows during zooming from a wide angle position to a telephoto position. When the focal lengths of the respective lens groups are configured to be positive, negative, negative, positive, and positive (P, N, N, P, and P), the second lens group G2 having a negative focal length and the third lens group G3 having a negative focal length may move from the object side O to an image side I. Also, during zooming from the wide angle position to the telephoto position, the fourth lens G4 may move toward the image side I and then back to the object side O after a middle position. When the focal lengths of the respective lens groups are configured to be positive, negative, positive, positive, and negative (P, N, P, P, and N), while zooming from the wide angle position to the telephoto position, the second lens group G2 having a negative focal length may move from the object side O to the image side I, whereas the third lens group G3 having a positive focal length may move from the object side O to the image side I at the wide angle position and from the image side I to the object side O at the telephoto position. Also, during zooming from the wide angle position to the telephoto position, the fourth lens G4 may move toward the object side O and then back to the image side I at the telephoto position after passing the middle position.

In the telephoto zoom lens system according to the present embodiment, the third or fourth lens group G3 or G4 having a positive focal length is used for focusing and that lens group may move in a direction toward the image side I during focusing.

An aperture stop stp may be located between the third and fourth lens groups G3 and G4 or between the fourth and fifth lens groups G4 and G5. For example, the third or fourth lens group G3 or G4 may include the stop stp. The diameter of the stop stp may not be changed with respect to a particular F number during zooming.

An image side surface of a lens located closest to the image side I of the fourth lens group G4 located directly in front of the hand shake compensation group may have a concave shape toward the image side I. When the lens located closest to the image side I of the fourth lens group G4 has such a shape, a concentric condition of a light ray is satisfied and thus a central coma may be reduced. A load of aberration correction according to the vertical movement of an optical axis of the hand shake compensation group is reduced and thus a change in performance according to hand shake compensation may be reduced.

The telephoto zoom lens system according to the present embodiment may satisfy the following Inequalities 1 and 2.

$$-0.25 \le \frac{1}{2}\left(\frac{f_{wide}}{f_{1AFwide}} + \frac{f_{tele}}{f_{1AFtele}}\right) \le 0.1 \quad \text{[Inequality 1]}$$

$$-3.5 \le \frac{f_{+,max}}{f_{-,min}} \le -1.7 \quad \text{[Inequality 2]}$$

Here, $f_{+,max}$ is the focal length of the lens group having the longest positive focal length of the second to fourth lens groups G2-G4 moving during zooming, $f_{-,min}$ is the focal length of the lens group having the shortest negative focal length of the second to fourth lens groups G2-G4 moving during zooming, $f_{1AFwide}$ is the focal length at the wide angle position from the first lens group G1 to the focusing lens group, $f_{wide}$ is the focal length at the wide angle position of the telephoto zoom lens system, $f_{1AFtele}$ is the focal length at the telephoto position from the first lens group to the focusing lens group, and $f_{tele}$ is the focal length at the telephoto position of the telephoto zoom lens system.

Satisfying Inequality 1 may guarantee optical performance according to a change in the position of the focusing lens group. When the value of Inequality 1 approaches 0, a combined focal length from the first lens group G1 to the focusing lens group may increase. In other words, the telephoto zoom lens system may become an a focal system from the first lens group G1 to the focusing lens group. When Inequality 1 is satisfied, light becomes almost parallel at the utmost image side of the focusing lens group. Accordingly, the focusing lens group may have a structure that is advantageous for aberration correction according to a change in an object distance. When Inequality 1 is satisfied, a change in optical performance during focusing is not much so that a degree of freedom to select the position of the stop stp may increase.

The $f_{+,max}$ in Inequality 1 is the focal length of the third lens group G3 in the first embodiment and the value thereof is 57.938, the focal length of the third lens group G3 in the second embodiment and the value thereof is 50.592, the focal length of the fourth lens group G4 in the third embodiment and the value thereof is 59.439, and the focal length of the fourth lens group G4 in the fourth embodiment and the value thereof is 54.251. The $f_{-,min}$ in Inequality 1 is the focal length of the second lens group G2 in the first embodiment and the value thereof is −21.628, the focal length of the second lens group G2 in the second embodiment and the value thereof is −18.079 the focal length of the second lens group G2 in the third embodiment and the value thereof is −18.450, and the focal length of the third lens group G3 in the fourth embodiment and the value thereof is −29.981.

The following table shows focal lengths of the respective lens groups.

|  | $1^{st}$ Lens Group | $2^{nd}$ Lens Group | $3^{rd}$ Lens Group | $4^{th}$ Lens Group | $5^{th}$ Lens Group |
| --- | --- | --- | --- | --- | --- |
| $1^{st}$ Embodiment | 80.045 | −21.628 | 57.938 | 55.362 | −146.983 |
| $2^{nd}$ Embodiment | 85.252 | −18.079 | 50.592 | 47.825 | −152.333 |
| $3^{rd}$ embodiment | 72.865 | −18.450 | 53.727 | 59.439 | −252.092 |
| $4^{th}$ Embodiment | 76.523 | −56.526 | −29.981 | 54.251 | 65.212 |

Inequality 2 is related to aberration correction of movable lens groups during zooming. When the focal lengths of the movable lens groups are similar to one another, the movable lens groups are in charge of similar amounts of aberration correction and thus performance of a lens system may be improved and sensitivity according to assembly may be reduced. In other words, when the focal length of a lens group is relatively long, a change in performance according to movement of the lens group may not be great and thus the burden of aberration correction of another lens group may be reduced. The telephoto zoom lens system according to the present embodiment may satisfy the following Inequality 3.

$$0.85 \leq \frac{f_4}{f_{wide}} \leq 1.2 \qquad \text{[Inequality 3]}$$

In Inequality 3, $f_4$ is the focal length of the fourth lens group G4 and $f_{wide}$ is the focal length at the wide angle position of the telephoto zoom lens system. Satisfying Inequality 3 may decrease the diameter of the hand shake compensation group and may make the hand shake compensation group lighter. When the fourth lens group G4 located in front of the hand shake compensation group has a positive refractive power and a relatively short focal length, a light flux incident on the hand shake compensation group decreases and thus the diameter of the hand shake compensation group may be decreased.

When "f4/fwide" is less than the lower limit of Inequality 3, curves of a lens closest to the object side O of the fourth lens group G4 decrease. Accordingly, processing of the lens may be difficult or the sensitivity of the fourth lens group G4 may increase and thus manufacturing of the lens may be made difficult. Also, for example, when the stop stp is provided behind the fourth lens group G4 or in the fifth lens group G5, the diameter of the stop stp maybe reduced. When the stop stp is provided in the fifth lens group G5, since the fifth lens group G5 is fixed during zooming, a mechanical structure for the stop stp may be simplified. The design data of the telephoto zoom lens system according to the present embodiment will now be described below. In the following description, f is the total focal length in units of millimeters (mm), Fno is an F number, 2ω is a viewing angle in units of degrees, R is a radius of curvature, Dn is a distance between lenses or a thickness of a lens, Nd is a refractive index, vd is an Abbe number, and stp is a stop. In the drawings illustrating the respective embodiments, at least one filter p may be provided at a position closest to the image side I.

1st Embodiment

FIG. 1 is a view schematically illustrating a wide angle position, a middle position, and a telephoto position of the telephoto zoom lens system according to the first embodiment. The following table shows design data of the first embodiment. In FIG. 1, only a few lens surface symbols are illustrated.

| Lens Surface | R | Dn | Nd | Vd |
|---|---|---|---|---|
| obj | Infinity | D1 | | |
| 1 | 122.310 | 2.000 | 1.80610 | 33.27 |
| 2 | 53.362 | 7.720 | 1.48749 | 70.44 |
| 3 | 444.274 | 0.100 | | |
| 4 | 85.639 | 5.500 | 1.48749 | 70.44 |
| 5 | 301.165 | 0.100 | | |
| 6 | 60.663 | 7.900 | 1.49700 | 81.61 |
| 7 | −496.555 | D2 | | |
| 8 | Infinity | 1.000 | 1.69680 | 55.46 |
| 9 | 33.092 | 3.756 | | |
| 10 | −65.199 | 1.000 | 1.77250 | 49.62 |
| 11 | 30.164 | 4.830 | 1.84666 | 23.78 |
| 12 | −349.974 | 1.794 | | |
| 13 | −43.054 | 1.000 | 1.69680 | 55.46 |
| 14 | −446.234 | D3 | | |
| 15 | −227.824 | 3.000 | 1.71300 | 53.94 |
| 16 | −57.775 | 0.100 | | |
| 17 | 66.707 | 6.110 | 1.56883 | 56.04 |
| 18 | −44.938 | 1.000 | 1.84666 | 23.78 |
| 19 | −151.305 | D4 | | |
| 20 (stp) | Infinity | 1.500 | | |
| 21 | 34.955 | 5.000 | 1.49700 | 81.61 |
| 22 | Infinity | 0.100 | | |
| 23 | 37.428 | 4.500 | 1.83481 | 42.72 |
| 24 | 41.536 | D5 | | |
| 25 | Infinity | 3.660 | 1.75520 | 27.53 |
| 26 | −40.657 | 1.000 | 1.58144 | 40.89 |
| 27 | 59.714 | 3.899 | | |
| 28 | −212.739 | 1.000 | 1.71300 | 53.94 |
| 29 | 40.152 | 2.899 | | |
| 30 | 134.158 | 2.580 | 1.67003 | 47.20 |
| 31 | −61.715 | 0.100 | | |
| 32 | 44.038 | 5.430 | 1.49700 | 81.61 |
| 33 | −25.258 | 2.000 | 1.84666 | 23.78 |
| 34 | 65.279 | 4.942 | | |
| 35 | 49.057 | 3.340 | 1.92286 | 20.88 |
| 36 | −233.149 | 4.345 | | |
| 37 | −33.155 | 1.500 | 1.69680 | 55.46 |
| 38 | −51.112 | D6 | | |
| 39 | Infinity | 2.800 | 1.51680 | 64.20 |
| 40 | Infinity | D7 | | |
| img | Infinity | 0.000 | | |

The following table shows a variable distance, a focal length, a viewing angle, and an F number during zooming in the first embodiment. Here, Z1 is distances between groups D1~D7, a focal length f, a viewing angle 2w, and an F number Fno, at the wide angle position. Z2 and Z3 are values at the middle position and at the telephoto position, respectively. Also, Z4 is the distances between groups D1~D7 and the focal length f of a zoom lens system when an object distance of the first lens surface at the wide angle position is 820 mm. Z5 and Z6 each denote the distances between groups D1~D7 and the focal length f of a zoom lens system when the object distances at the middle position and at the telephoto position are 820 mm.

| | Z1 | Z2 | Z3 | Z4 | Z5 | Z6 |
|---|---|---|---|---|---|---|
| D1 | Infinity | infinity | infinity | 820.000000 | 820.000000 | 820.000000 |
| D2 | 2.060000 | 16.910997 | 31.761994 | 2.060000 | 16.910997 | 31.761994 |
| D3 | 21.105581 | 15.711455 | 2.005624 | 22.751041 | 19.089388 | 12.670344 |
| D4 | 22.336643 | 12.579772 | 12.145747 | 20.691183 | 9.201839 | 1.481027 |
| D5 | 6.000000 | 6.300000 | 5.588859 | 6.000000 | 6.300000 | 5.588859 |
| D6 | 29.992776 | 29.992776 | 29.992776 | 29.992776 | 29.992776 | 29.992776 |
| D7 | 1.000000 | 1.000000 | 1.000000 | 1.000000 | 1.000000 | 1.000000 |
| f | 51.232 | 76.363 | 145.394 | 0.0575 | 0.0794 | 0.1242 |
| 2w | 15.54 | 10.57 | 5.60 | | | |
| Fno | 2.87 | 2.89 | 2.85 | | | |

Figure 2:
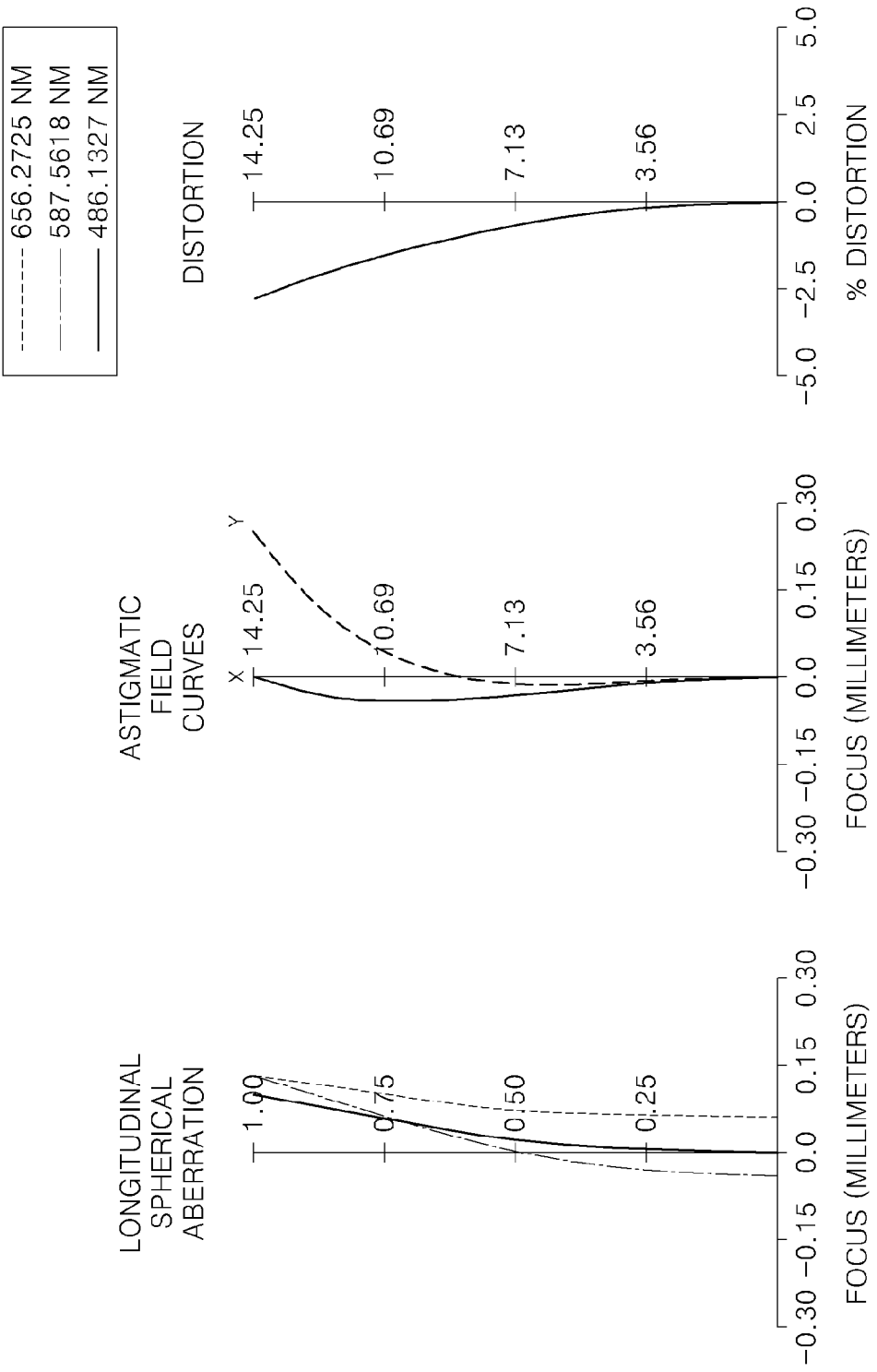
FIGS. 2 to 4 are aberration diagrams of the telephoto zoom lens system of FIG. 1 at a wide angle position, a middle position, and a telephoto position.
Figure 3:
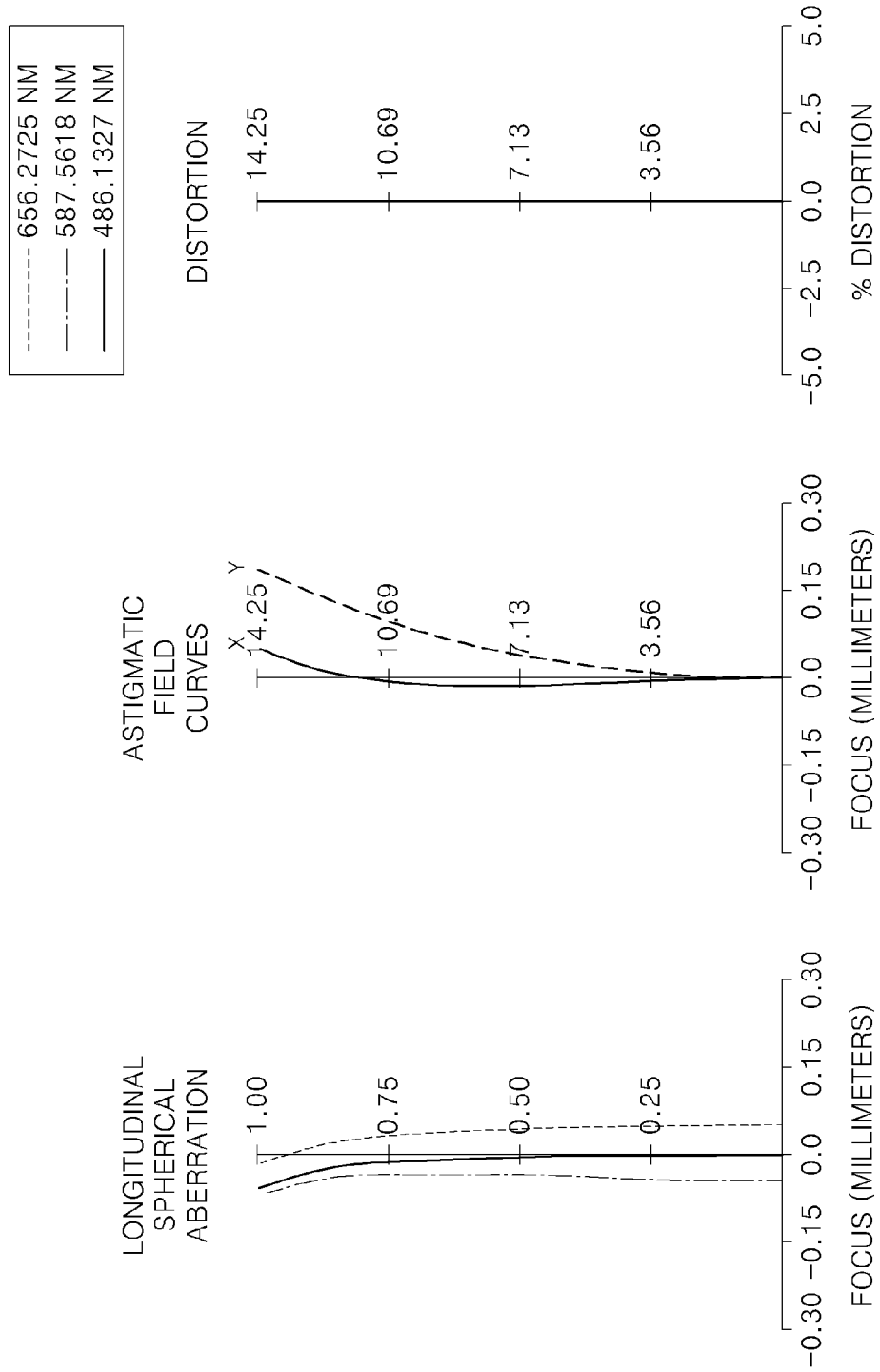
Figure 4:
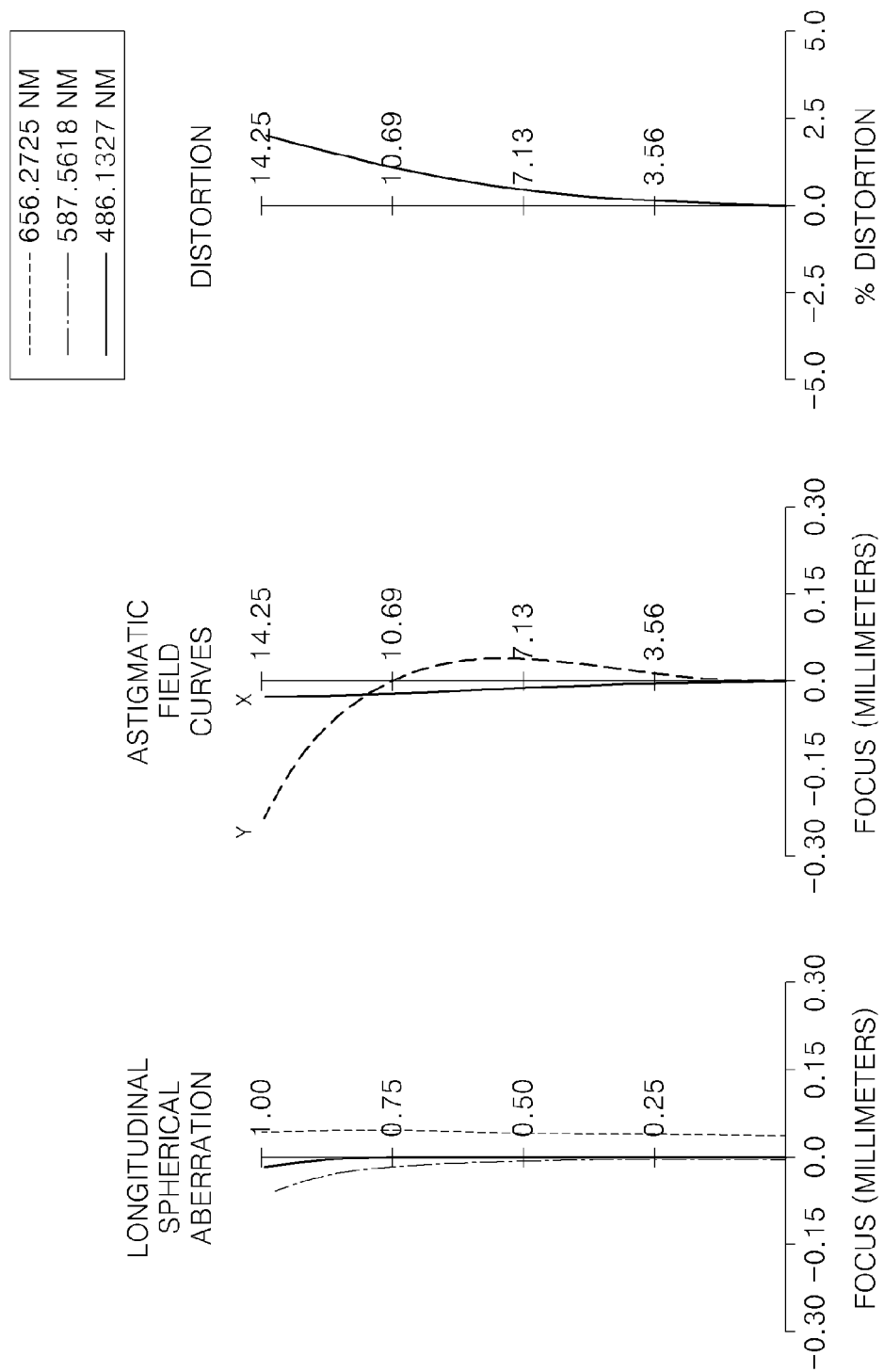

FIGS. 2 to 4 are aberration diagrams respectively illustrating longitudinal spherical aberration, astigmatic field curves, and distortion of the telephoto zoom lens system of FIG. 1 at the wide angle position, the middle position, and the telephoto position. The astigmatic field curves include tangential field curves T and sagittal field curves S.

2nd Embodiment

Figure 5:
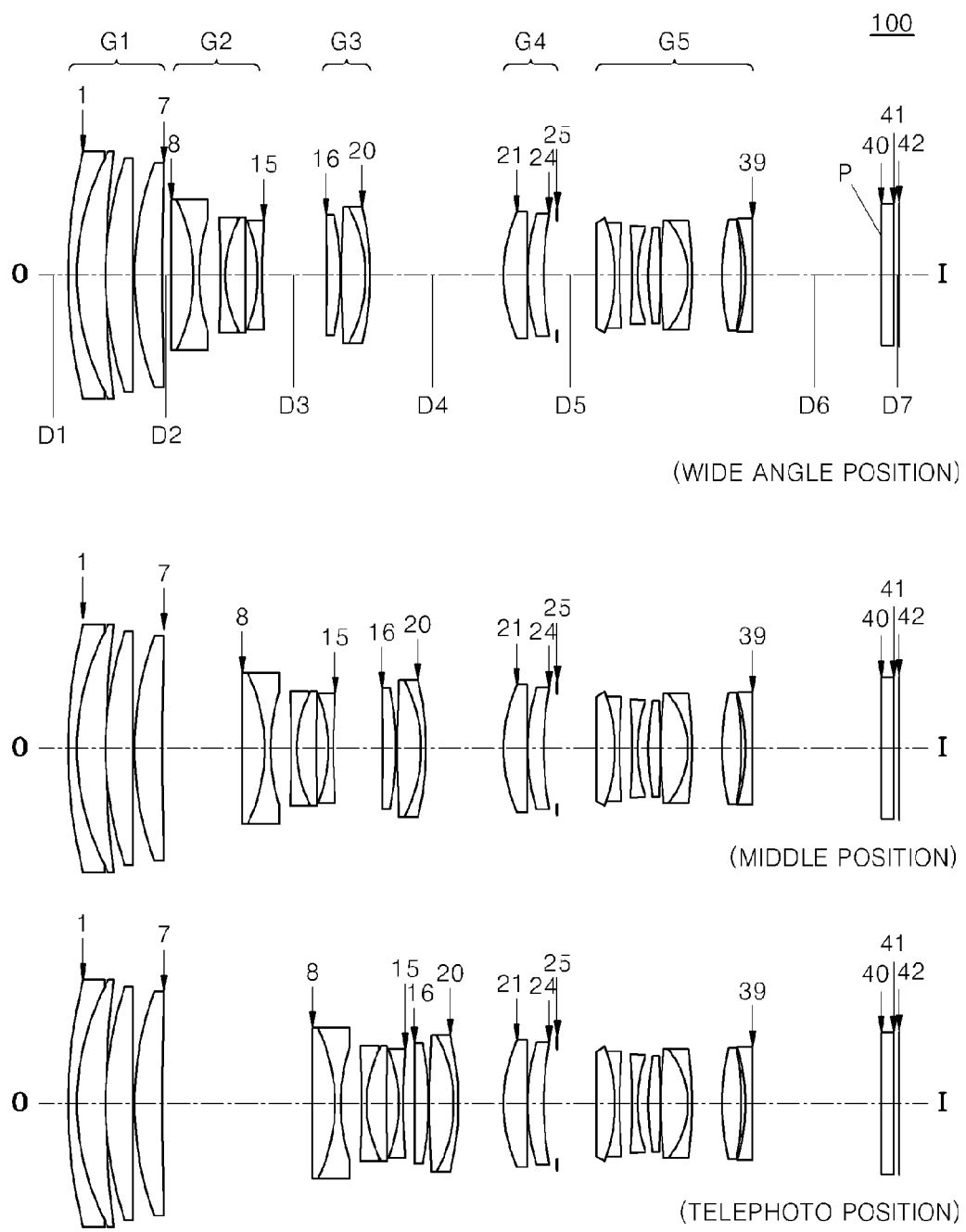
FIG. 5 is a view schematically illustrating a wide angle position, a middle position, and a telephoto position of a telephoto zoom lens system according to a second embodiment.

FIG. 5 illustrates the telephoto zoom lens system according to the second embodiment. The following table shows design data of the second embodiment.

| Lens Surface | R | Dn | Nd | Vd |
|---|---|---|---|---|
| obj | infinity | D1 | | |
| 1 | 115.728 | 2.000 | 1.71736 | 29.50 |
| 2 | 57.177 | 6.000 | 1.49700 | 81.61 |
| 3 | 168.831 | 0.100 | | |
| 4 | 82.396 | 6.000 | 1.49700 | 81.61 |
| 5 | −6384.608 | 0.100 | | |
| 6 | 69.687 | 6.000 | 1.49700 | 81.61 |
| 7 | 744.560 | D2 | | |
| 8 | infinity | 4.910 | 1.90366 | 31.31 |
| 9 | −37.381 | 1.000 | 1.74330 | 49.22 |
| 10 | 39.774 | 4.765 | | |
| 11 | −134.522 | 1.000 | 1.77250 | 49.62 |
| 12 | 26.664 | 4.230 | 1.84666 | 23.78 |
| 13 | 299.189 | 2.570 | | |
| 14 | −30.012 | 1.000 | 1.77250 | 49.62 |
| 15 | 203.866 | D3 | | |
| 16 | −914.054 | 3.000 | 1.77250 | 49.62 |
| 17 | −58.600 | 0.100 | | |
| 18 | 254.982 | 5.200 | 1.62299 | 58.12 |
| 19 | −32.053 | 1.000 | 1.92286 | 20.88 |
| 20 | −63.148 | D4 | | |
| 21 | 33.611 | 5.150 | 1.49700 | 81.61 |
| 22 | 1189.073 | 0.100 | | |
| 23 | 47.090 | 3.500 | 1.77250 | 49.62 |
| 24 | 76.039 | D5 | | |
| 25 (stp) | infinity | 8.500 | | |
| 26 | infinity | 3.870 | 1.80518 | 25.46 |
| 27 | −35.830 | 0.900 | 1.64769 | 33.84 |
| 28 | 157.603 | 2.983 | | |
| 29 | −109.445 | 1.000 | 1.70154 | 41.15 |
| 30 | 32.631 | 2.244 | | |
| 31 | 55.779 | 2.710 | 1.54814 | 45.82 |
| 32 | −147.432 | 0.100 | | |
| 33 | 168.218 | 5.690 | 1.49700 | 81.61 |
| 34 | −18.611 | 1.000 | 1.84666 | 23.78 |
| 35 | −89.552 | 6.432 | | |
| 36 | 56.171 | 4.230 | 1.84666 | 23.78 |
| 37 | −60.741 | 0.767 | | |
| 38 | −41.703 | 1.500 | 1.77250 | 49.62 |
| 39 | −14883.511 | D6 | | |
| 40 | infinity | 2.800 | 1.51680 | 64.20 |
| 41 | infinity | D7 | | |
| img | infinity | 0.000 | | |

The following table shows a variable distance, a focal length, a viewing angle, and an F number during zooming in the second embodiment.

| | Z1 | Z2 | Z3 | Z4 | Z5 | Z6 |
|---|---|---|---|---|---|---|
| D1 | infinity | infinity | infinity | 821.500000 | 821.500000 | 821.500000 |
| D2 | 2.000000 | 17.229381 | 32.458762 | 2.000000 | 17.229381 | 32.458762 |
| D3 | 13.902263 | 10.757307 | 2.438708 | 15.057230 | 13.045507 | 9.026346 |
| D4 | 28.647879 | 16.378636 | 9.578497 | 27.492912 | 14.090436 | 2.990859 |
| D5 | 2.855558 | 3.040376 | 2.929733 | 2.855558 | 3.040376 | 2.929733 |
| D6 | 27.643300 | 27.643300 | 27.643300 | 27.643300 | 27.643300 | 27.643300 |
| D7 | 1.000000 | 1.000000 | 1.000000 | 1.000000 | 1.000000 | 1.000000 |
| f | 51.502 | 77.545 | 145.420 | 0.0578 | 0.0809 | 0.1280 |
| 2w | 15.47 | 10.41 | 5.60 | | | |
| Fno | 2.91 | 2.92 | 2.92 | | | |

Figure 6:
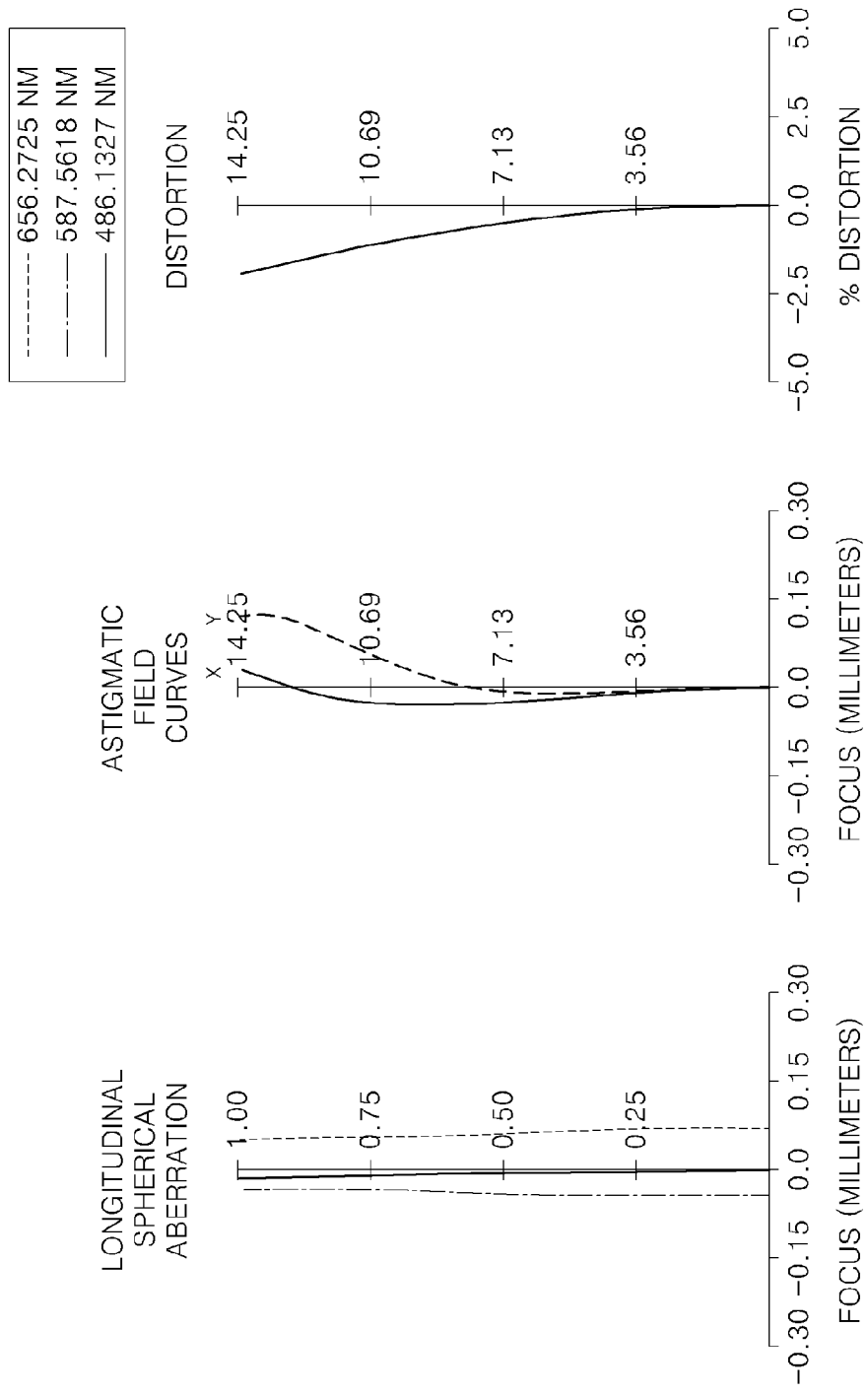
FIGS. 6 to 8 are aberration diagrams of the telephoto zoom lens system of FIG. 5 at a wide angle position, a middle position, and a telephoto position.
Figure 7:
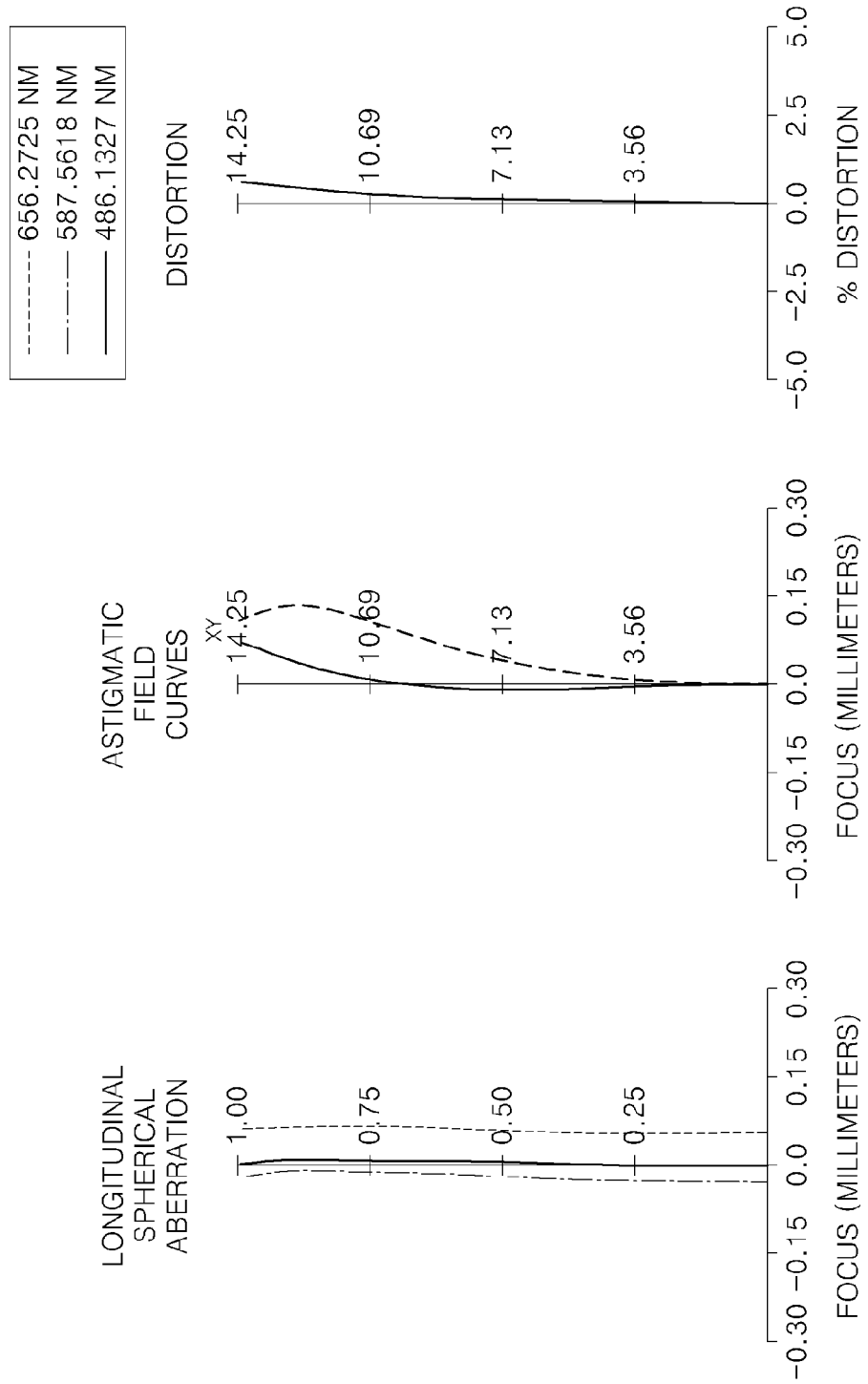
Figure 8:
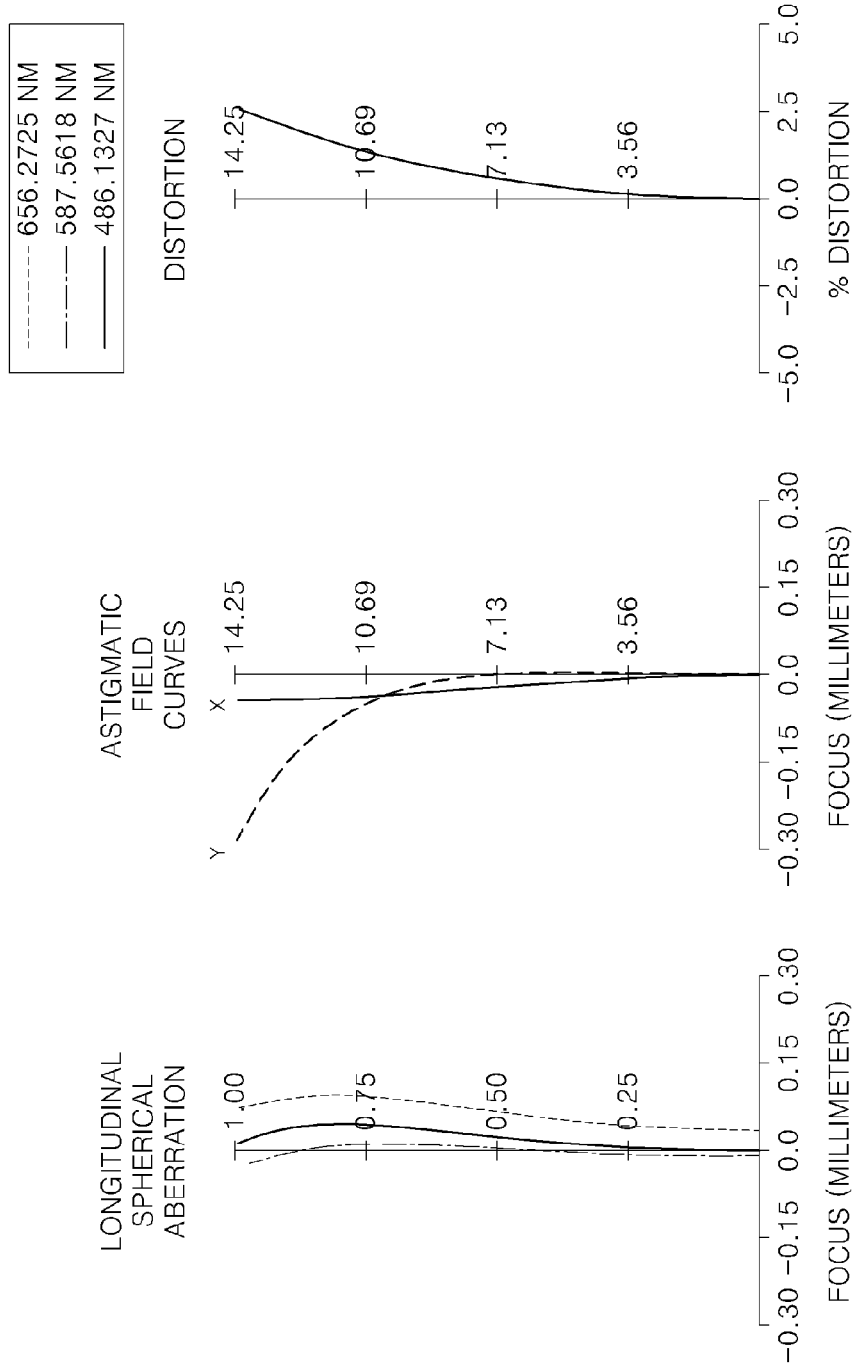

FIGS. 6 to 8 are aberration diagrams respectively illustrating longitudinal spherical aberration, astigmatic field curves, and distortion of the telephoto zoom lens system of FIG. 5 at the wide angle position, the middle position, and the telephoto position.

3rd Embodiment

Figure 9:
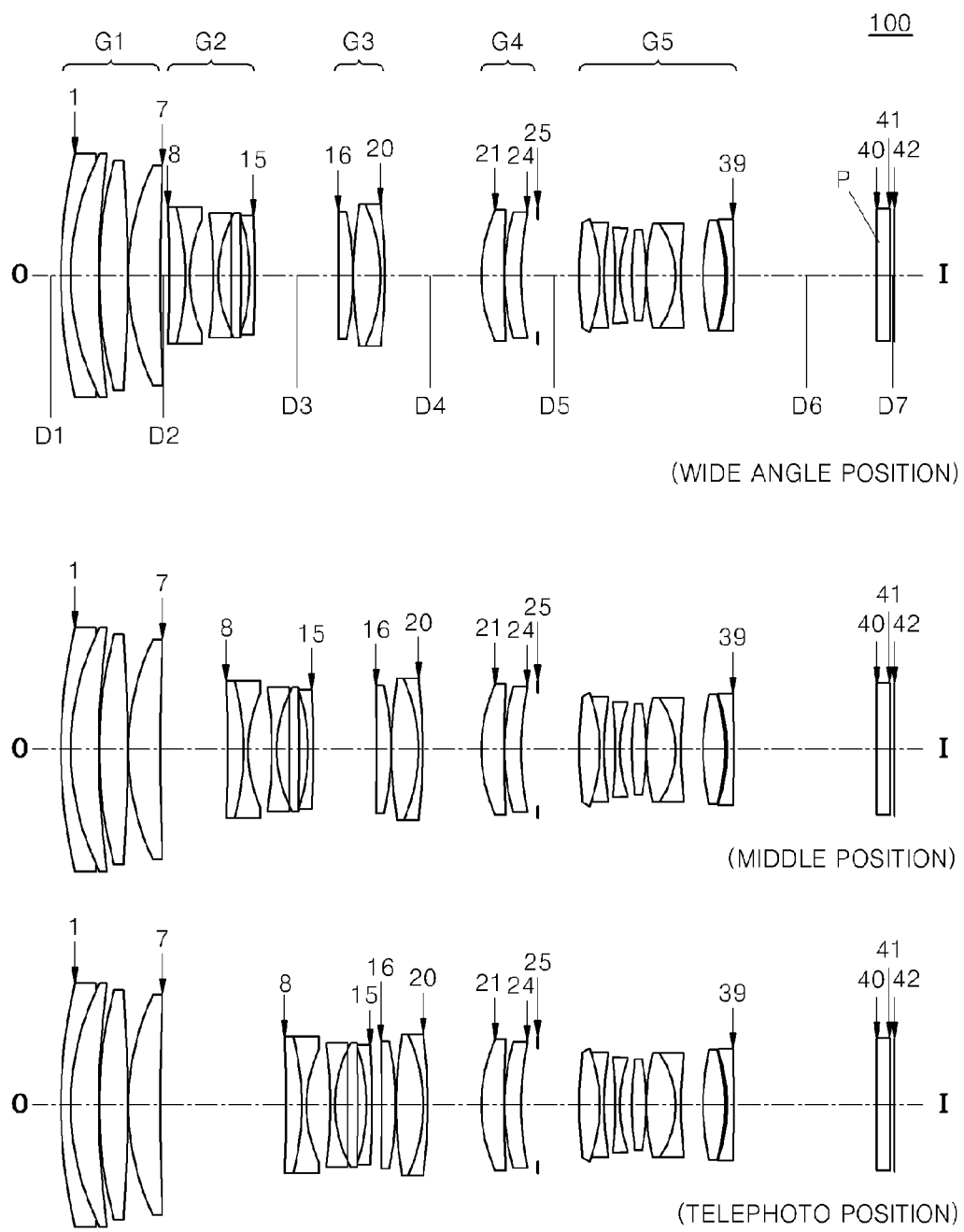
FIG. 9 is a view schematically illustrating a wide angle position, a middle position, and a telephoto position of a telephoto zoom lens system according to a third embodiment.

FIG. 9 illustrates the telephoto zoom lens system according to the third embodiment. The following table shows design data of the third embodiment.

| Lens Surface | R | Dn | Nd | Vd |
|---|---|---|---|---|
| obj | infinity | D1 | | |
| 1 | 118.622 | 2.000 | 1.71736 | 29.50 |
| 2 | 57.821 | 6.000 | 1.49700 | 81.61 |
| 3 | 180.521 | 0.100 | | |
| 4 | 97.884 | 6.150 | 1.49700 | 81.61 |
| 5 | −338.115 | 0.100 | | |
| 6 | 55.183 | 6.820 | 1.49700 | 81.61 |
| 7 | 478.347 | D2 | | |
| 8 | −304.865 | 3.430 | 1.90366 | 31.31 |
| 9 | −58.267 | 1.000 | 1.74330 | 49.22 |
| 10 | 30.404 | 4.957 | | |
| 11 | −81.311 | 1.000 | 1.77250 | 49.62 |
| 12 | 28.677 | 4.790 | 1.84666 | 23.78 |
| 13 | −525.202 | 2.049 | | |
| 14 | −37.550 | 1.000 | 1.77250 | 49.62 |
| 15 | −343.270 | D3 | | |
| 16 | −387.596 | 3.000 | 1.77250 | 49.62 |
| 17 | −61.530 | 0.100 | | |
| 18 | 99.944 | 5.710 | 1.63854 | 55.45 |
| 19 | −38.571 | 1.000 | 1.84666 | 23.78 |
| 20 | −118.474 | D4 | | |
| 21 | 34.904 | 4.870 | 1.49700 | 81.61 |
| 22 | 289.289 | 0.100 | | |
| 23 | 49.708 | 3.500 | 1.77250 | 49.62 |
| 24 | 65.604 | D5 | | |
| 25 (stp) | infinity | 9.000 | | |
| 26 | 138.681 | 4.210 | 1.80518 | 25.46 |
| 27 | −39.023 | 1.000 | 1.63980 | 34.57 |
| 28 | 58.571 | 2.438 | | |
| 29 | −112.818 | 1.000 | 1.70154 | 41.15 |
| 30 | 33.286 | 2.336 | | |
| 31 | 63.243 | 3.220 | 1.54814 | 45.82 |
| 32 | −57.822 | 0.100 | | |
| 33 | 49.133 | 6.120 | 1.49700 | 81.61 |
| 34 | −20.519 | 1.280 | 1.84666 | 23.78 |
| 35 | 100.426 | 4.574 | | |
| 36 | 52.135 | 4.710 | 1.84666 | 23.78 |
| 37 | −45.334 | 0.415 | | |
| 38 | −39.974 | 1.500 | 1.77250 | 49.62 |
| 39 | −500.000 | D6 | | |
| 40 | infinity | 2.800 | 1.51680 | 64.20 |
| 41 | infinity | D7 | | |
| img | infinity | D8 | | |

The following table shows a variable distance, a focal length, a viewing angle, and an F number during zooming in the third embodiment.

|     | Z1        | Z2        | Z3        | Z4         | Z5         | Z6         |
|-----|-----------|-----------|-----------|------------|------------|------------|
| D1  | infinity  | infinity  | infinity  | 822.000000 | 822.000000 | 822.000000 |
| D2  | 2.000000  | 14.503164 | 27.006329 | 2.000000   | 14.503164  | 27.006329  |
| D3  | 17.992059 | 13.669391 | 1.996395  | 19.310317  | 16.336789  | 10.130632  |
| D4  | 20.547616 | 12.131952 | 11.179177 | 19.229358  | 9.464554   | 3.044940   |
| D5  | 3.536301  | 3.771468  | 3.894074  | 3.536301   | 3.771468   | 3.894074   |
| D6  | 30.545024 | 30.545024 | 30.545024 | 30.545024  | 30.545024  | 30.545024  |
| D7  | 0.998047  | 0.979068  | 0.955691  | 1.040561   | 1.069125   | 1.131946   |
| D8  | 0.024259  | 0.033990  | 0.035717  | −0.010580  | −0.041779  | −0.107061  |
| F   | 51.497    | 76.355    | 145.435   | 0.0578     | 0.0799     | 0.1284     |
| 2w  | 15.79     | 10.50     | 5.45      |            |            |            |
| Fno | 2.89      | 2.89      | 2.89      |            |            |            |

Figure 10:
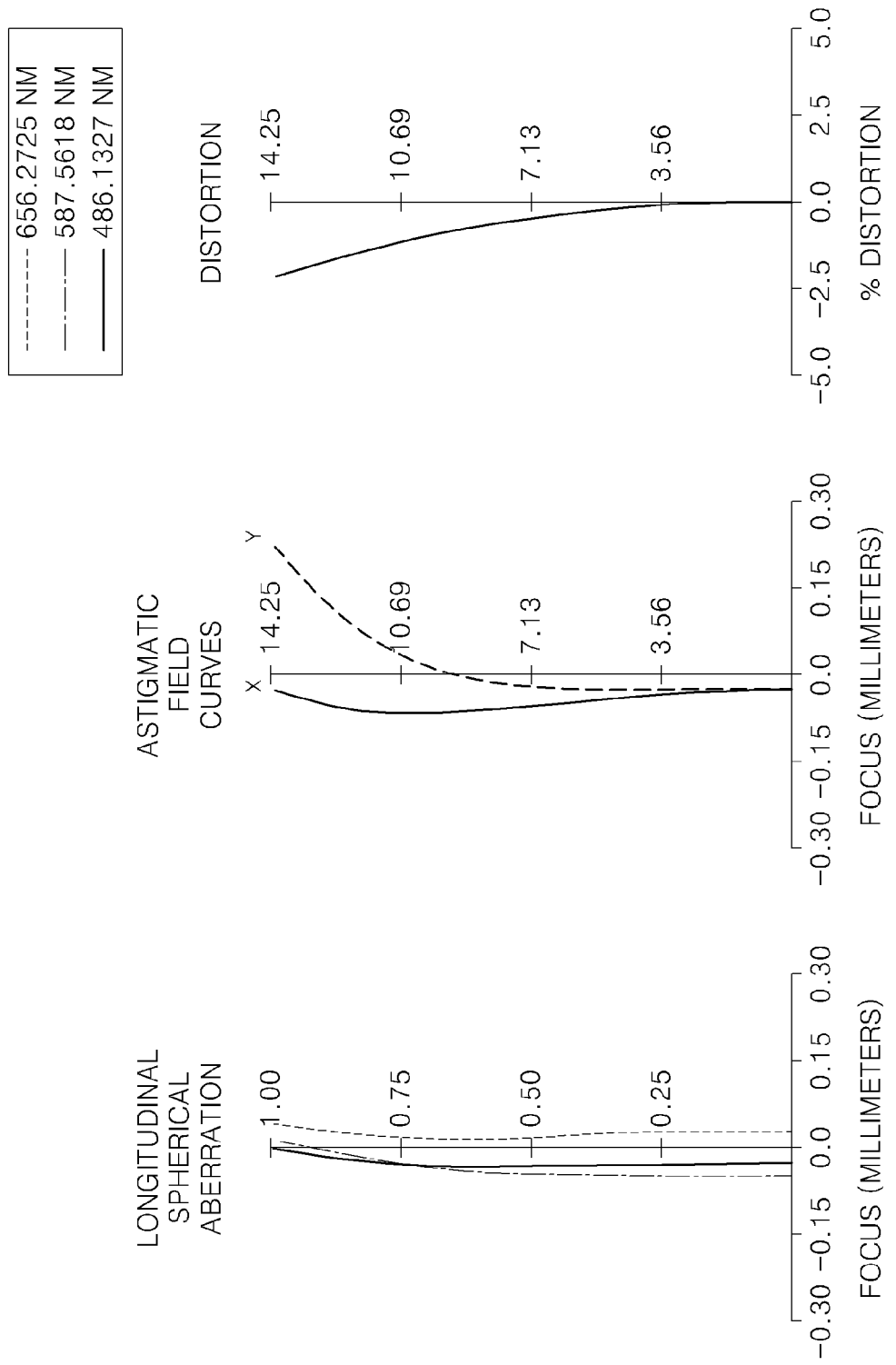
FIGS. 10 to 12 are aberration diagrams of the telephoto zoom lens system of FIG. 9 at a wide angle position, a middle position, and a telephoto position.
Figure 11:
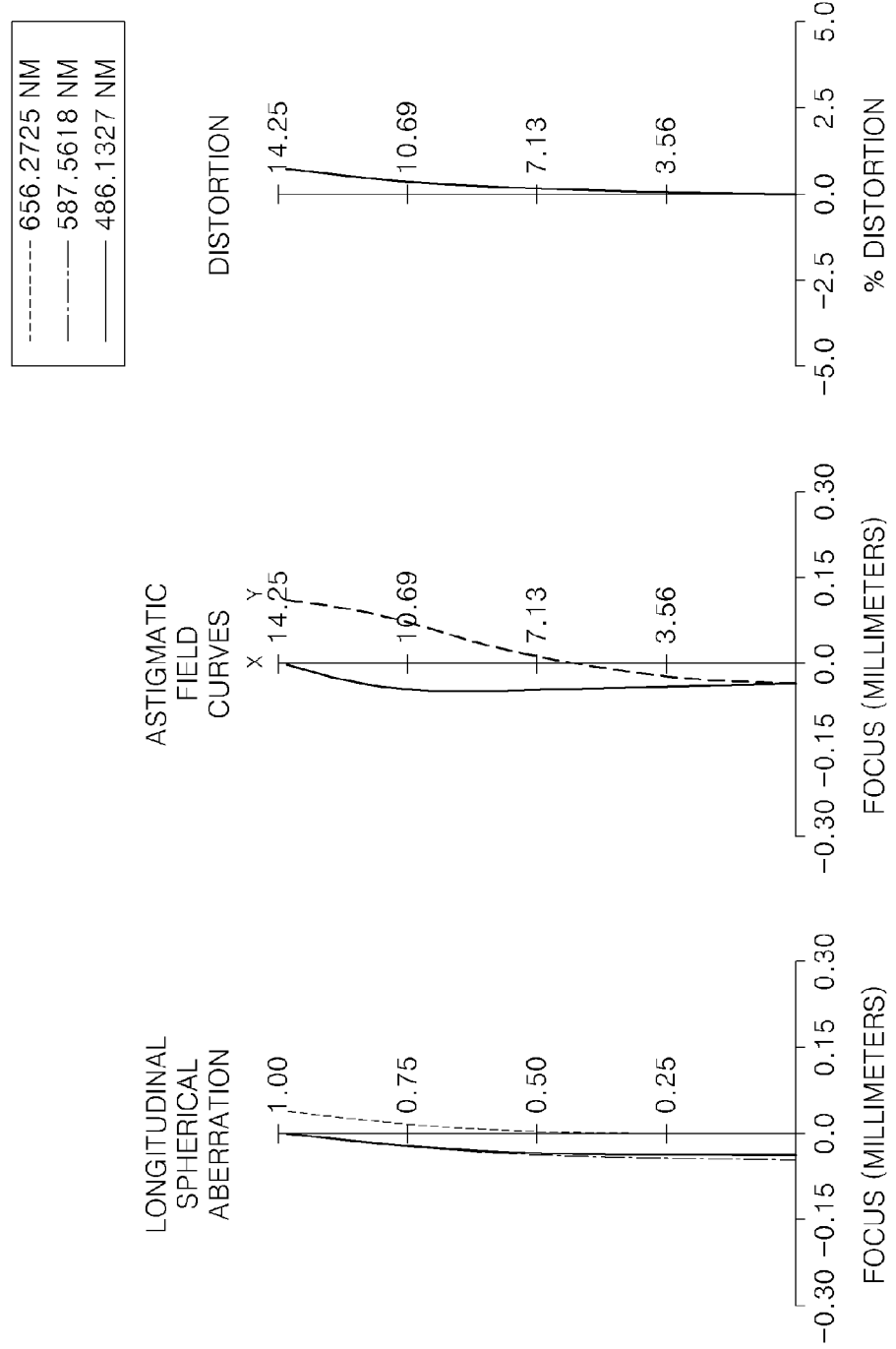
Figure 12:
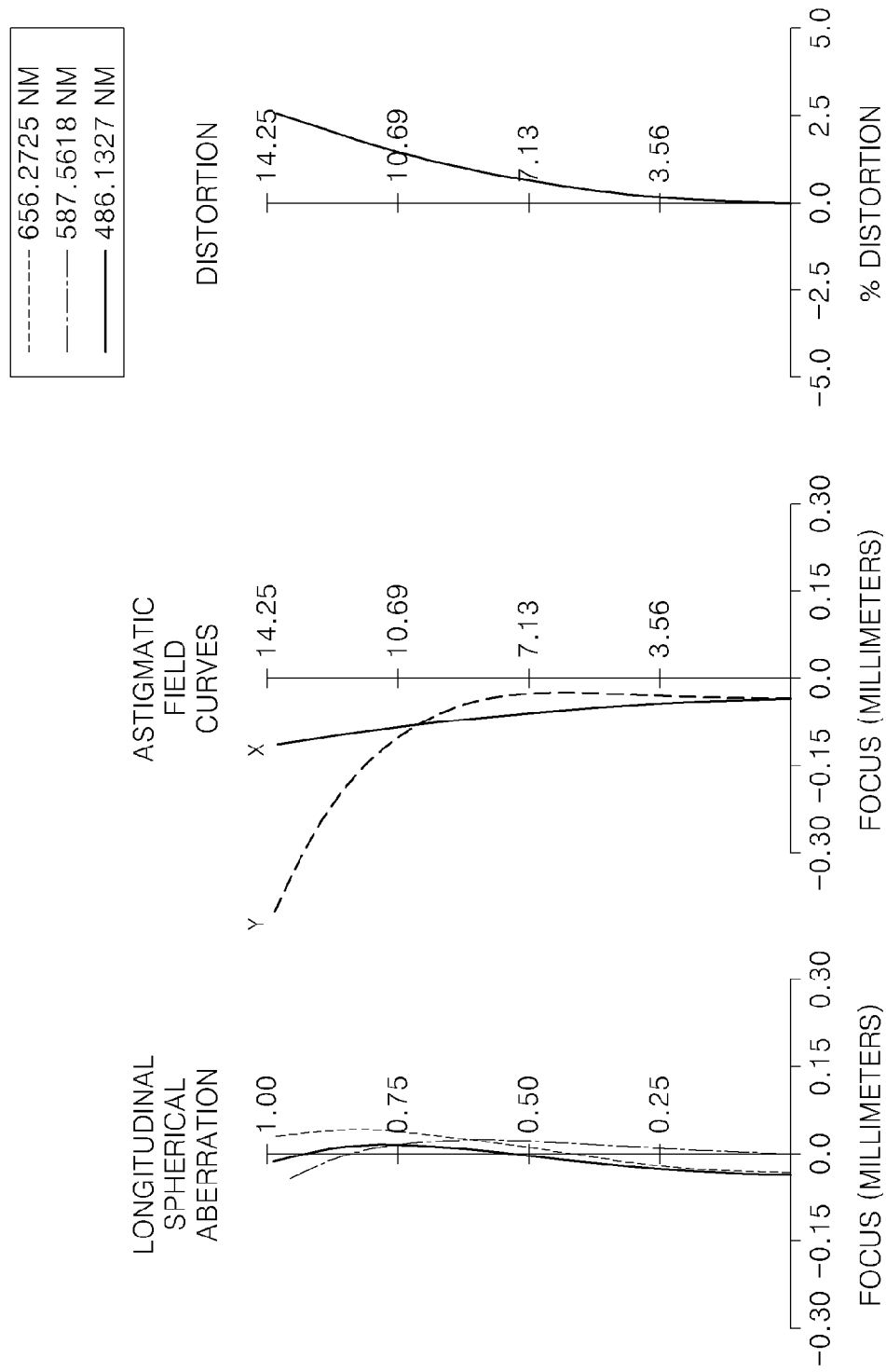

FIGS. 10 to 12 are aberration diagrams respectively illustrating longitudinal spherical aberration, astigmatic field curves, and distortion of the telephoto zoom lens system of FIG. 9 at the wide angle position, the middle position, and the telephoto position.

$4^{th}$ Embodiment

Figure 13:
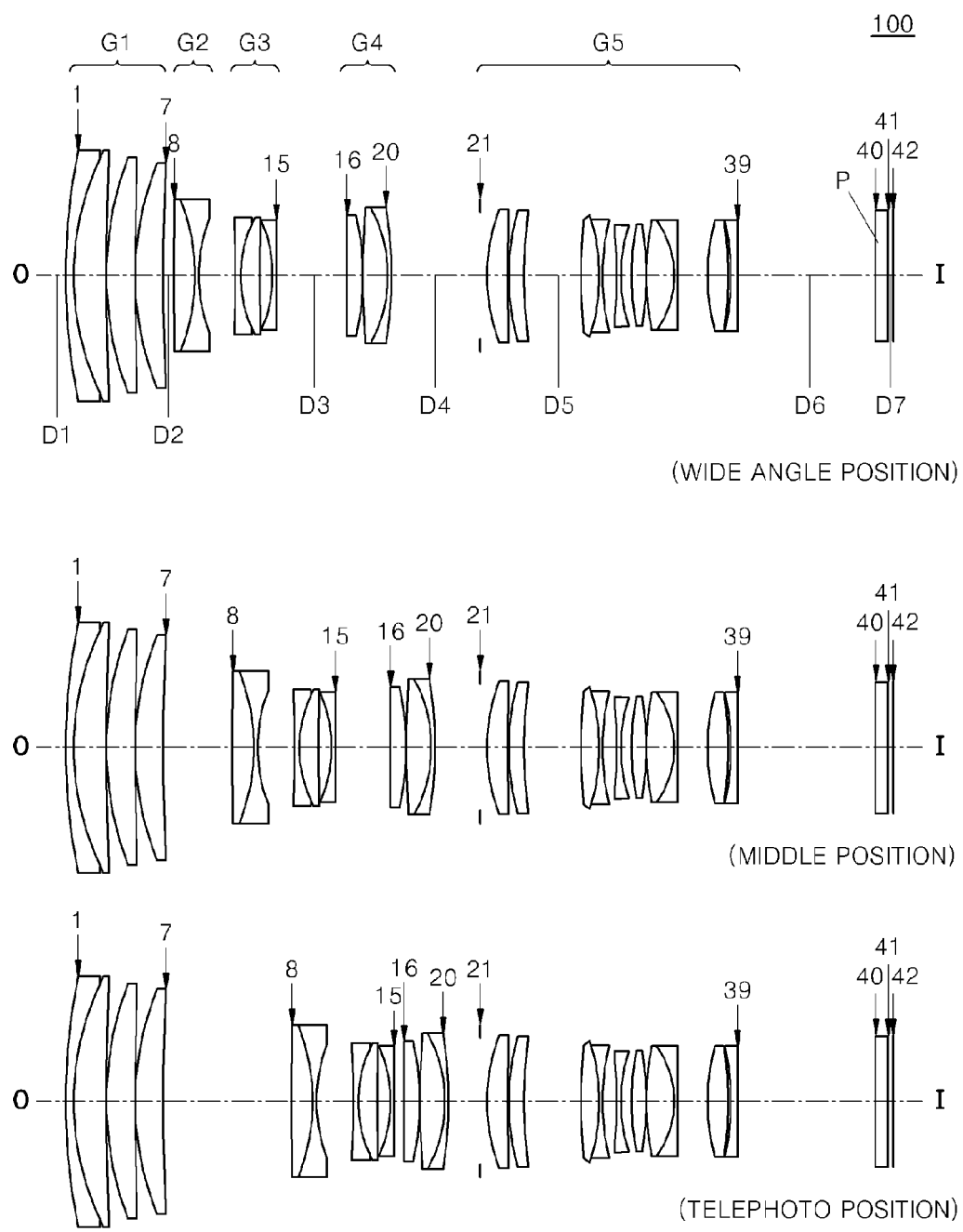
FIG. 13 is a view schematically illustrating a wide angle position, a middle position, and a telephoto position of a telephoto zoom lens system according to a fourth embodiment.

FIG. 13 illustrates the telephoto zoom lens system according to the fourth embodiment. The following table shows design data of the fourth embodiment.

| Lens Surface | R        | Dn    | Nd      | Vd    |
|--------------|----------|-------|---------|-------|
| obj          | infinity | D1    |         |       |
| 1            | 136.212  | 1.78  | 1.71736 | 29.50 |
| 2            | 60.789   | 6.9   | 1.49700 | 81.61 |
| 3            | 464.49   | 0.1   |         |       |
| 4            | 71.523   | 6.2   | 1.49700 | 81.61 |
| 5            | 705.927  | 0.1   |         |       |
| 6            | 68.308   | 6.04  | 1.49700 | 81.61 |
| 7            | 658.7    | D2    |         |       |
| 8            | 1000     | 4.63  | 1.90366 | 31.31 |
| 9            | −45.118  | 0.8   | 1.74330 | 49.22 |
| 10           | 33.471   | D3    |         |       |
| 11           | −190.212 | 0.82  | 1.77250 | 49.62 |
| 12           | 26.294   | 4.12  | 1.84666 | 23.78 |
| 13           | 268.879  | 2.938 |         |       |
| 14           | −28.447  | 0.8   | 1.77250 | 49.62 |
| 15           | 597.59   | D4    |         |       |

-continued

| Lens Surface | R        | Dn     | Nd      | Vd    |
|--------------|----------|--------|---------|-------|
| 16           | 3567.572 | 3.3    | 1.77250 | 49.62 |
| 17           | −64.566  | 0.1    |         |       |
| 18           | 195.534  | 5.32   | 1.63854 | 55.45 |
| 19           | −31.681  | 0.82   | 1.84666 | 23.78 |
| 20           | −86.604  | D5     |         |       |
| 21 (stp)     | infinity | 1.4    |         |       |
| 22           | 37.463   | 4.53   | 1.49700 | 81.61 |
| 23           | 377.107  | 0.1    |         |       |
| 24           | 51.787   | 3.5    | 1.77250 | 49.62 |
| 25           | 107.459  | 12.065 |         |       |
| 26           | 119.535  | 4.05   | 1.80518 | 25.46 |
| 27           | −44.955  | 0.8    | 1.63980 | 34.57 |
| 28           | 52.821   | 2.983  |         |       |
| 29           | −131.204 | 0.8    | 1.70154 | 41.15 |
| 30           | 33.252   | 2.408  |         |       |
| 31           | 61.528   | 3.01   | 1.54814 | 45.82 |
| 32           | −80.079  | 0.1    |         |       |
| 33           | 63.957   | 6.08   | 1.49700 | 81.61 |
| 34           | −20.518  | 0.8    | 1.84666 | 23.78 |
| 35           | −500     | 6.418  |         |       |
| 36           | 49.316   | 4.36   | 1.84666 | 23.78 |
| 37           | −71.078  | 0.647  |         |       |
| 38           | −50.669  | 1.28   | 1.77250 | 49.62 |
| 39           | 500      | D6     |         |       |
| 40           | infinity | 2.8    | 1.51680 | 64.20 |
| 41           | infinity | D7     |         |       |
| img          | infinity | D8     |         |       |

The following table shows a variable distance, a focal length, a viewing angle, and an F number during zooming in the fourth embodiment.

|     | Z1        | Z2        | Z3        | Z4         | Z5         | Z6         |
|-----|-----------|-----------|-----------|------------|------------|------------|
| D1  | infinity  | infinity  | infinity  | 822.000000 | 822.000000 | 822.000000 |
| D2  | 2.070864  | 14.818007 | 27.565152 | 2.070864   | 14.818007  | 27.565152  |
| D3  | 8.075305  | 7.076406  | 5.704144  | 8.075305   | 7.076406   | 5.704144   |
| D4  | 15.237417 | 11.859299 | 2.109936  | 16.468372  | 14.351196  | 9.459459   |
| D5  | 19.027614 | 10.657488 | 9.031968  | 17.796659  | 8.165591   | 1.682445   |
| D6  | 29.689801 | 29.689799 | 29.689800 | 29.689801  | 29.689799  | 29.689800  |
| D7  | 1.049759  | 0.956677  | 0.990260  | 1.087909   | 1.038962   | 1.147365   |
| D8  | −0.023839 | 0.055782  | 0.009415  | −0.05726   | −0.017943  | −0.131725  |
| f   | 51.521    | 77.487    | 145.436   | 0.0574     | 0.0804     | 0.1286     |
| 2w  | 15.79     | 10.50     | 5.45      |            |            |            |
| Fno | 2.89      | 2.89      | 2.89      |            |            |            |

Figure 14:
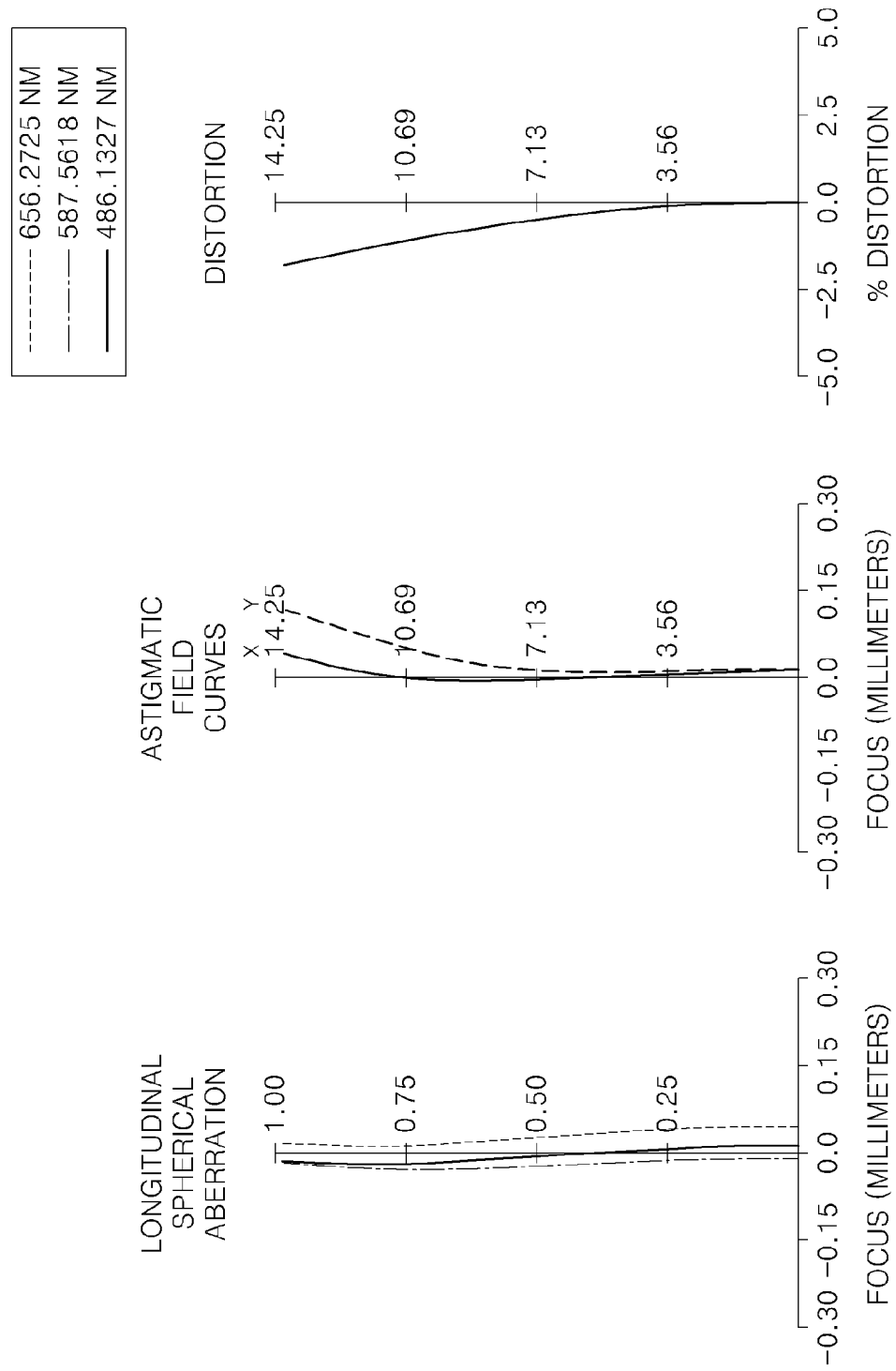
FIGS. 14 to 16 are aberration diagrams of the telephoto zoom lens system of FIG. 13 at a wide angle position, a middle position, and a telephoto position.
Figure 15:
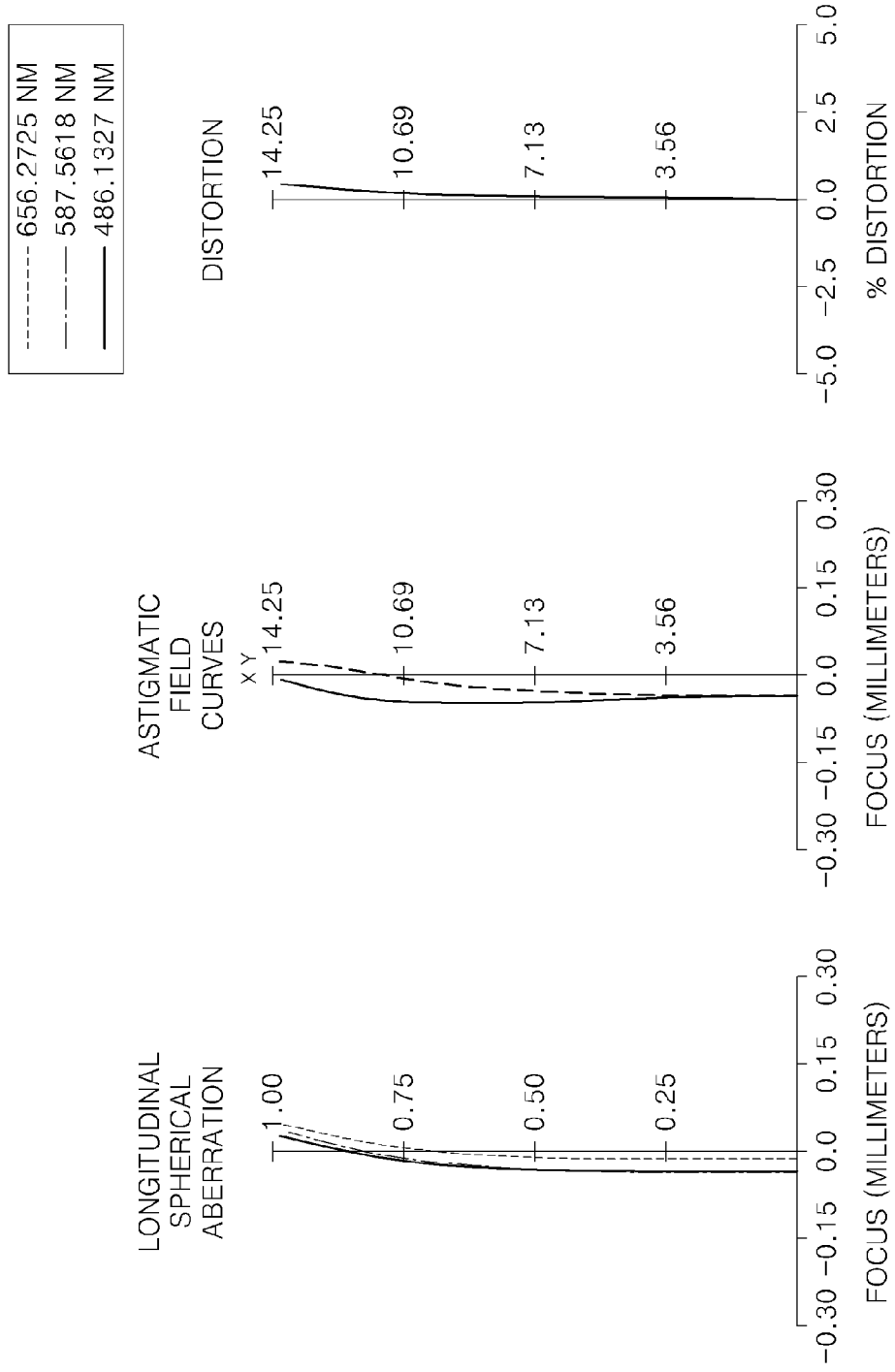
Figure 16:
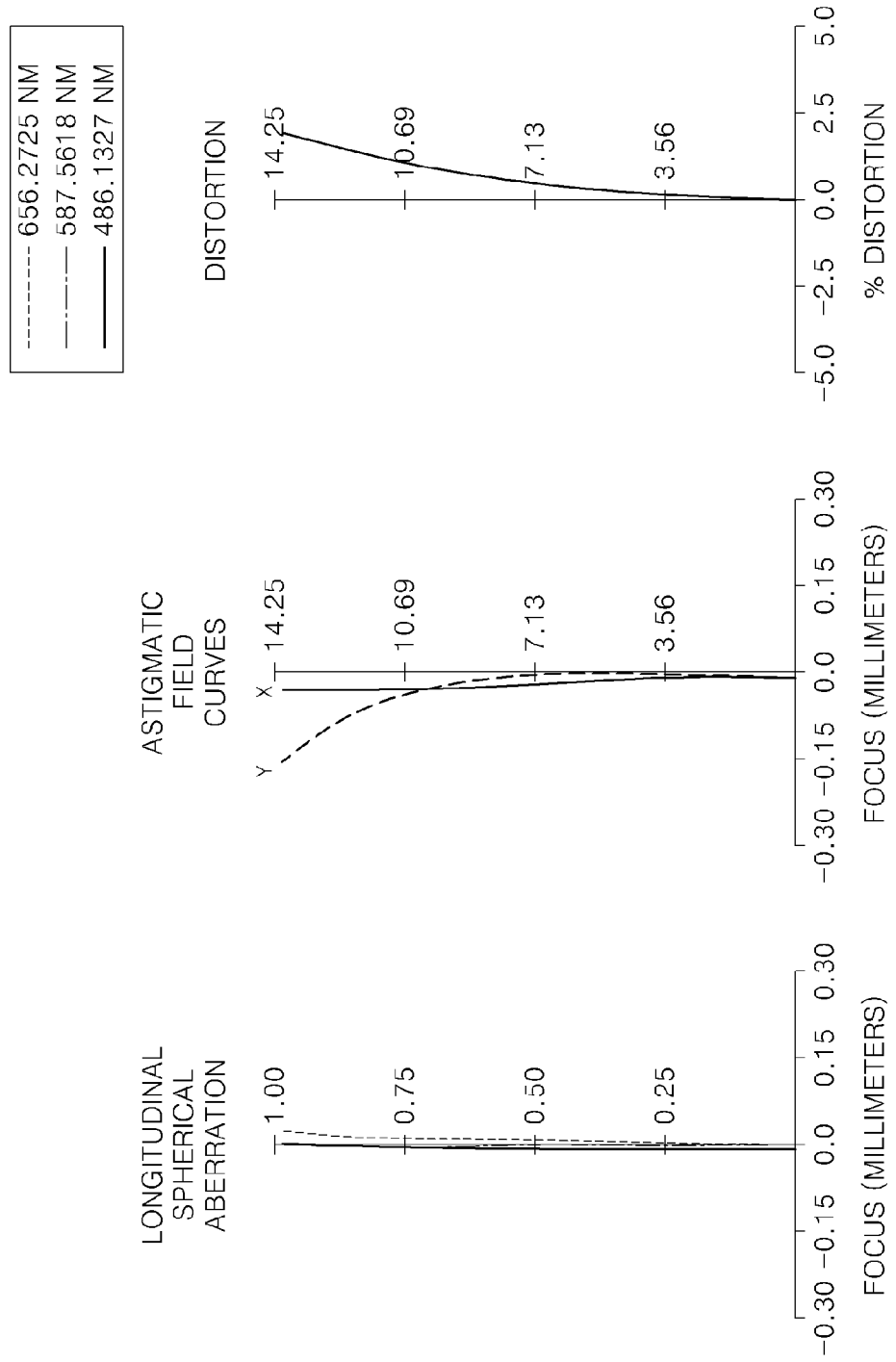

FIGS. 14 to 16 are aberration diagrams respectively illustrating longitudinal spherical aberration, astigmatic field curves, and distortion of the telephoto zoom lens system of FIG. 13 at the wide angle position, the middle position, and the telephoto position.

The following table shows that the telephoto zoom lens systems according to the first to fourth embodiments satisfy the Inequalities 1, 2, and 3.

|  | 1st Embodiment | 2nd Embodiment | 3rd Embodiment | 4th Embodiment |
|---|---|---|---|---|
| Inequality 1 | 0.072 | −0.168 | −0.005 | −0.202 |
| Inequality 2 | −2.679 | −2.798 | −3.222 | −1.810 |
| Inequality 3 | 1.08 | 0.93 | 1.15 | 1.05 |

The telephoto zoom lens system may be used for a photographing apparatus such as lens interchangeable camera, a digital camera, a camcorder, etc., which uses an image device.

Figure 17:
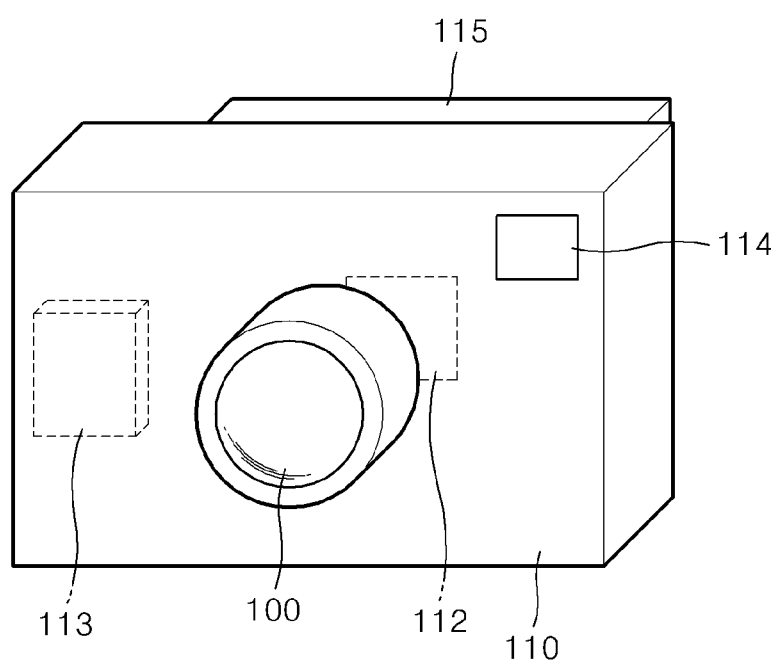
FIG. 17 is a perspective view schematically illustrating a photographing apparatus according to an embodiment.

FIG. 17 is a perspective view schematically illustrating an embodiment of a photographing apparatus 110 having the telephoto zoom lens system 100. Referring to FIG. 17, the photographing apparatus 110 may include the telephoto zoom lens system 100 described above and an imaging device 112 for receiving light formed by the telephoto zoom lens system 100. The photographing apparatus 100 may include a recording unit 113 for recording information corresponding to an object that is photoelectrically converted from the imaging device 112 and a view finder 114 for observing the object. Also, the photographing apparatus 100 may further include a display unit 115 for displaying the object image. Although in the present embodiment the view finder 114 and the display unit 115 are separately provided, a display unit may be provided without a view finder. The photographing apparatus of FIG. 17 is a mere example and may be applied to a variety of optical devices. Since the telephoto zoom lens system is applied to a photographing apparatus such as a digital camera, focusing may be quickly performed and a photographing apparatus that is easy to carry may be embodied.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A telephoto zoom lens system comprising:
a first lens group having a positive focal length;
a second lens group having a negative focal length;
a third lens group having a positive or negative focal length;
a fourth lens group having a positive focal length; and
a fifth lens group for performing hand shake compensation by moving a portion of the fifth lens group perpendicularly to an optical axis,
wherein, during zooming, the first and fifth lens groups are fixed and the second, third, and fourth lens groups move, the third or fourth lens group is a focusing lens group, and the following inequalities are satisfied:

$$-0.25 \leq \frac{1}{2}\left(\frac{f_{wide}}{f_{1AFwide}} + \frac{f_{tele}}{f_{1AFtele}}\right) \leq 0.1$$

and $$-3.5 \leq \frac{f_{+,max}}{f_{-,min}} \leq -1.7,$$

wherein $f_{+,max}$ is the focal length of the lens group having the longest positive focal length of the second to fourth lens groups moving during zooming, $f_{-,min}$ is the focal length of the lens group having the shortest negative focal length of the second to fourth lens groups moving during zooming, $f_{1AFwide}$ is the focal length at the wide angle position from the first lens group to the focusing lens group, $f_{wide}$ is the focal length at the wide angle position of the telephoto zoom lens system, $f_{1AFtele}$ is the focal length at the telephoto position from the first lens group to the focusing lens group, and $f_{tele}$ is the focal length at the telephoto position of the telephoto zoom lens system.

2. The telephoto zoom lens system of claim 1, satisfying the following inequality:

$$0.85 \leq \frac{f_4}{f_{wide}} \leq 1.2,$$

wherein $f_4$ is the focal length of the fourth lens group and $f_{wide}$ is the focal length at the wide angle position of the telephoto zoom lens system.

3. The telephoto zoom lens system of claim 2, wherein the third lens group has a positive focal length and the fifth lens group has a negative focal length.

4. The telephoto zoom lens system of claim 1, wherein a hand shake compensation group of the fifth lens group is located on the object side within the fifth lens group.

5. The telephoto zoom lens system of claim 1, wherein any one of the third, fourth, and fifth lens groups comprises a stop.

6. The telephoto zoom lens system of claim 1, wherein a lens surface located closest to the image side of the fourth lens group has a concave shape toward the image side.

7. The telephoto zoom lens system of claim 1, wherein the first and fifth lens groups are fixed during focusing.

8. The telephoto zoom lens system of claim 1, wherein an F number is fixed during focusing.

9. A telephoto zoom lens system comprising:
a first lens group having a positive focal length;
a second lens group having a negative focal length;
a third lens group having a negative focal length;
a fourth lens group having a positive focal length; and
a fifth lens group having a positive focal length and including a hand shake compensation group that performs hand shake compensation by allowing a portion of the fifth lens group to move perpendicularly to the optical axis,
wherein, during zooming, the first and fifth lens groups are fixed and the second, third, and fourth lens groups move, the fourth lens group is a focusing lens group, and the following inequalities are satisfied, $$-0.25 \leq \frac{1}{2}\left(\frac{f_{wide}}{f_{1AFwide}} + \frac{f_{tele}}{f_{1AFtele}}\right) \leq 0.1$$

and $$-3.5 \leq \frac{f_{+,max}}{f_{-,min}} \leq -1.7,$$

wherein $f_{+,max}$ is the focal length of the lens group having the longest positive focal length of the second to fourth lens groups moving during zooming, $f_{-,min}$ is the focal length of the lens group having the shortest negative focal length of the second to fourth lens groups moving during zooming, $f_{1AFwide}$ is the focal length at the wide angle position from the first lens group to the focusing lens group, $f_{wide}$ is the focal length at the wide angle position of the telephoto zoom lens system, $f_{1AFtele}$ is the focal length at the telephoto position from the first lens group to the focusing lens group, and $f_{tele}$ is the focal length at the telephoto position of the telephoto zoom lens system.

10. The telephoto zoom lens system of claim 9, satisfying the following inequality, $$0.85 \leq \frac{f_4}{f_{wide}} \leq 1.2,$$

wherein $f_4$ is the focal length of the fourth lens group and $f_{wide}$ is the focal length at the wide angle position of the telephoto zoom lens system.

11. The telephoto zoom lens system of claim 9, wherein the hand shake compensation group of the fifth lens group is located on the object side within the fifth lens group.

12. The telephoto zoom lens system of claim 9, wherein the first and fifth lens groups are fixed while the fourth lens group performs focusing.

13. The telephoto zoom lens system of claim 9, wherein any one of the third, fourth, and fifth lens groups comprises a stop.

14. The telephoto zoom lens system of claim 9, wherein the lens surface located closest to the image side of the fourth lens group has a concave shape toward the image side.

15. The telephoto zoom lens system of claim 9, wherein an F number is fixed during focusing.

16. The telephoto zoom lens system of claim 9, wherein, during zooming, the second lens group moves toward the image side and the third lens group moves toward the image side.

17. A photographing apparatus comprising:
a telephoto zoom lens system; and
an imaging device for receiving an image formed by the telephoto zoom lens system,
wherein the telephoto zoom lens system comprises a first lens group having a positive focal length, a second lens group having a negative focal length, a third lens group having a positive or negative focal length, a fourth lens group having a positive focal length, and a fifth lens group for performing hand shake compensation by allowing a portion of the fifth lens group to move perpendicularly to the optical axis,
wherein, during zooming, the first and fifth lens groups are fixed and the second, third, and fourth lens groups move, the third or fourth lens group is a focusing lens group, and the following inequalities are satisfied, $$-0.25 \leq \frac{1}{2}\left(\frac{f_{wide}}{f_{1AFwide}} + \frac{f_{tele}}{f_{1AFtele}}\right) \leq 0.1$$

and $$-3.5 \leq \frac{f_{+,max}}{f_{-,min}} \leq -1.7,$$

wherein $f_{+,max}$ is the focal length of the lens group having the longest positive focal length of the second to fourth lens groups moving during zooming, $f_{-,min}$ is the focal length of the lens group having the shortest negative focal length of the second to fourth lens groups moving during zooming, $f_{1AFwide}$ is the focal length at the wide angle position from the first lens group to the focusing lens group, $f_{wide}$ is the focal length at the wide angle position of the telephoto zoom lens system, $f_{1AFtele}$ is the focal length at the telephoto position from the first lens group to the focusing lens group, and $f_{tele}$ is the focal length at the telephoto position of the telephoto zoom lens system.

\* \* \* \* \*